United States Patent
Oishi et al.

(10) Patent No.: US 11,632,144 B2
(45) Date of Patent: Apr. 18, 2023

(54) COMMUNICATION DEVICE, INFORMATION PROCESSING METHOD, AND STORAGE MEDIUM

(71) Applicant: KABUSHIKI KAISHA TOKAI RIKA DENKI SEISAKUSHO, Aichi (JP)

(72) Inventors: Yoshiki Oishi, Aichi (JP); Satoshi Mori, Aichi (JP); Kenichi Koga, Aichi (JP); Tatsuya Koike, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 221 days.

(21) Appl. No.: 17/152,889

(22) Filed: Jan. 20, 2021

(65) Prior Publication Data

US 2021/0258042 A1    Aug. 19, 2021

(30) Foreign Application Priority Data

Feb. 14, 2020   (JP) .............................. JP2020-023214

(51) Int. Cl.
*G01S 3/10* (2006.01)
*G01S 3/48* (2006.01)
*H04B 1/7163* (2011.01)

(52) U.S. Cl.
CPC ............ *H04B 1/71637* (2013.01); *G01S 3/10* (2013.01); *G01S 3/48* (2013.01); *H04B 2201/71634* (2013.01)

(58) Field of Classification Search
CPC ..... G01S 3/10; G01S 3/48; G01S 3/50; G01S 5/0218; G01S 5/12; H04B 1/71637; H04B 2201/71634
See application file for complete search history.

(56) References Cited

U.S. PATENT DOCUMENTS

| 8,908,744 B1* | 12/2014 | Qi ..................... H04B 17/345 |
| | | 375/149 |
| 2015/0295620 A1* | 10/2015 | Dehmas ................ H04B 1/06 |
| | | 375/138 |
| 2022/0239532 A1* | 7/2022 | Niewczas ............. H04W 12/03 |

FOREIGN PATENT DOCUMENTS

WO    2015/176776    11/2015

* cited by examiner

*Primary Examiner* — David B Lugo
(74) *Attorney, Agent, or Firm* — Greenblum & Bernstein, P.L.C.

(57) ABSTRACT

A communication device includes: a plurality of wireless communication sections, each of which is configured to wirelessly receive a signal from another communication device; and a control section configured to perform a detection process of detecting specific elements with regard to a plurality of correlation computation results, each of which is obtained by correlating a first signal that is transmitted from the other communication device and each of second signals at the designated interval and includes a correlation value indicating magnitude of correlation between the first signal and the second signal as an element obtained at the designated interval, and control a change process of treating a wireless communication section having earliest time corresponding to the specific element as a first wireless communication section among the plurality of wireless communication sections, treating the other wireless communication section as a second wireless communication section among the plurality of wireless communication sections.

12 Claims, 12 Drawing Sheets

FIG.9
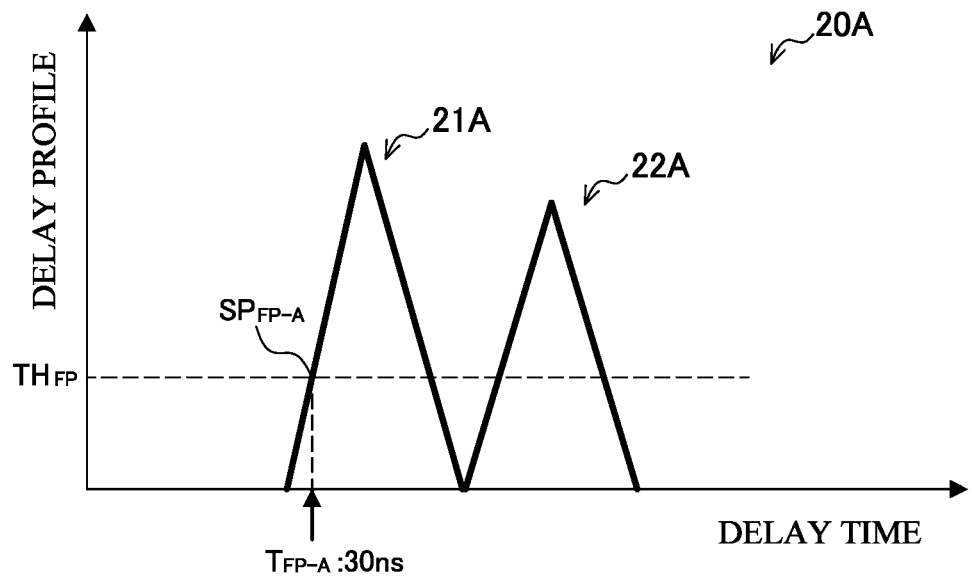
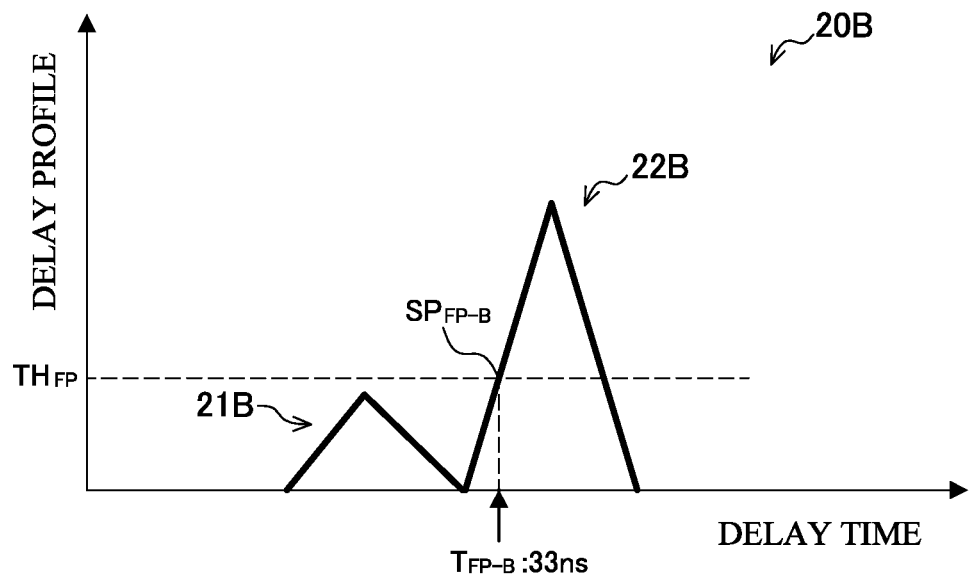

FIG.10
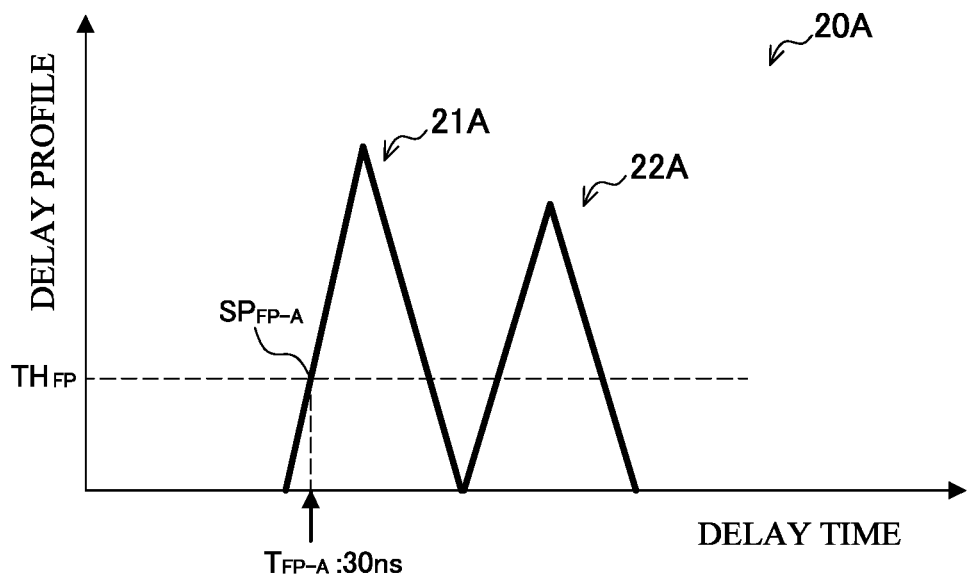
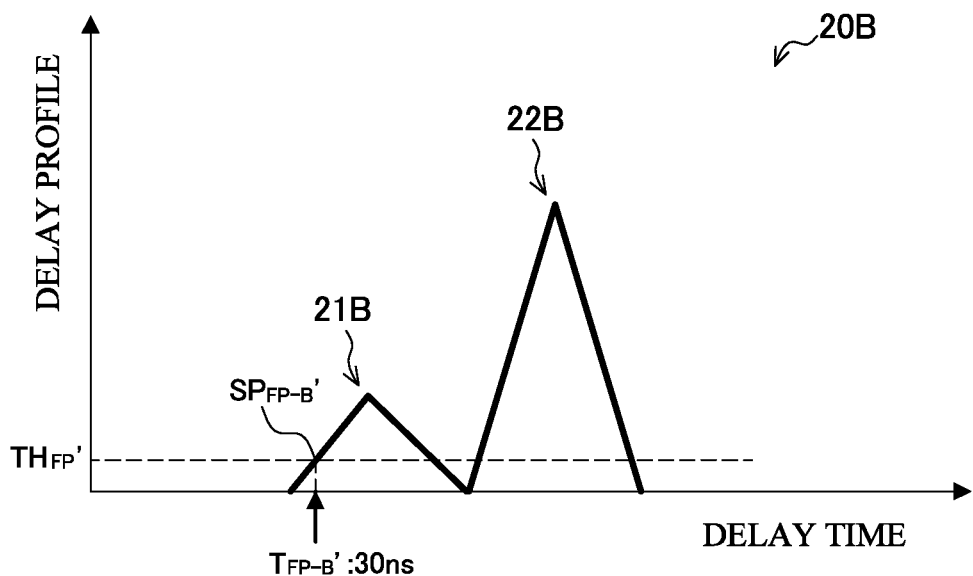

COMMUNICATION DEVICE, INFORMATION PROCESSING METHOD, AND STORAGE MEDIUM

CROSS REFERENCE TO RELATED APPLICATION(S)

This application is based upon and claims benefit of priority from Japanese Patent Application No. JP2020-023214, filed on Feb. 14, 2020, the entire contents of which are incorporated herein by reference.

BACKGROUND

The present invention relates to a communication device, an information processing method, and a storage medium.

In recent years, technologies that allow one device to estimate a position of another device in accordance with a result of transmitting/receiving a signal between the devices have been developed. As an example of the technologies of estimating a position, WO 2015/176776 A1 discloses a technology that allows an UWB (ultra-wideband) receiver to estimate an angle of incidence of a wireless signal from an UWB transmitter by performing wireless communication using UWB.

However, the technology disclosed by WO 2015/176776 A1 has a problem of reduction in accuracy of estimating the angle of incidence of the wireless signal in an environment where an obstacle is interposed between the transmitter and the receiver, or other environments.

Accordingly, the present invention is made in view of the aforementioned issues, and an object of the present invention is to provide a mechanism that makes it possible to improve accuracy of estimating a position.

SUMMARY

To solve the above described problem, according to an aspect of the present invention, there is provided a communication device comprising: a plurality of wireless communication sections, each of which is configured to wirelessly receive a signal from another communication device; and a control section configured to correlate a first signal that is transmitted from the other communication device and that includes change in amplitude with respective second signals obtained when the plurality of wireless communication sections receive the first signal, at a designated interval, perform a detection process of detecting one or more elements whose correlation value indicating magnitude of correlation between the first signal and the second signals exceeds a first threshold as specific elements, with regard to a plurality of correlation computation results, each of which is obtained by correlating the first signal and each of the second signals at the designated interval and includes the correlation value as an element obtained at the designated interval, and control a change process of treating a wireless communication section having earliest time corresponding to the specific element as a first wireless communication section among the plurality of wireless communication sections, treating the other wireless communication section as a second wireless communication section among the plurality of wireless communication sections, and changing the specific element of the second wireless communication section on a basis of time corresponding to the specific element of the first wireless communication section.

To solve the above described problem, according to another aspect of the present invention, there is provided a communication device comprising: a plurality of wireless communication sections, each of which is configured to wirelessly receive a signal from another communication device; and a control section configured to correlate a first signal that is transmitted from the other communication device and that includes change in amplitude with respective second signals obtained when the plurality of wireless communication sections receive the first signal, at a designated interval, perform a detection process of detecting one or more elements whose correlation value indicating magnitude of correlation between the first signal and the second signals exceeds a first threshold as specific elements, with regard to a plurality of correlation computation results, each of which is obtained by correlating the first signal and each of the second signals at the designated interval and includes the correlation value as an element obtained at the designated interval, and control a change process of treating a wireless communication section having earliest time corresponding to the specific element as a first wireless communication section among the plurality of wireless communication sections, treating the other wireless communication section as a second wireless communication section among the plurality of wireless communication sections, and changing the specific element of the second wireless communication section on a basis of time corresponding to the specific element of the first wireless communication section.

To solve the above described problem, according to another aspect of the present invention, there is provided a storage medium having a program stored therein, the program causing a computer for controlling a communication device including a plurality of wireless communication sections, each of which is configured to wirelessly receive a signal from another communication device, to function as a control section configured to correlate a first signal that is transmitted from the other communication device and that includes change in amplitude with respective second signals obtained when the plurality of wireless communication sections receive the first signal, at a designated interval; perform a detection process of detecting one or more elements whose correlation value indicating magnitude of correlation between the first signal and the second signals exceeds a first threshold as specific elements, with regard to a plurality of correlation computation results, each of which is obtained by correlating the first signal and each of the second signals at the designated interval and includes the correlation value as an element obtained at the designated interval; and control a change process of treating a wireless communication section having earliest time corresponding to the specific element as a first wireless communication section among the plurality of wireless communication sections, treating the other wireless communication section as a second wireless communication section among the plurality of wireless communication sections, and changing the specific element of the second wireless communication section on a basis of time corresponding to the specific element of the first wireless communication section.

As described above, according to the present invention, it is possible to provide the mechanism that makes it possible to improve accuracy of estimating a position.

BRIEF DESCRIPTION OF THE DRAWINGS

FIG. 9 is graphs illustrating examples of CIRs with regard to a plurality of wireless communication sections.

FIG. 10 is diagrams for describing a first example of a specific element change process according to the embodiment.

DETAILED DESCRIPTION OF THE EMBODIMENT(S)

Figure 1:
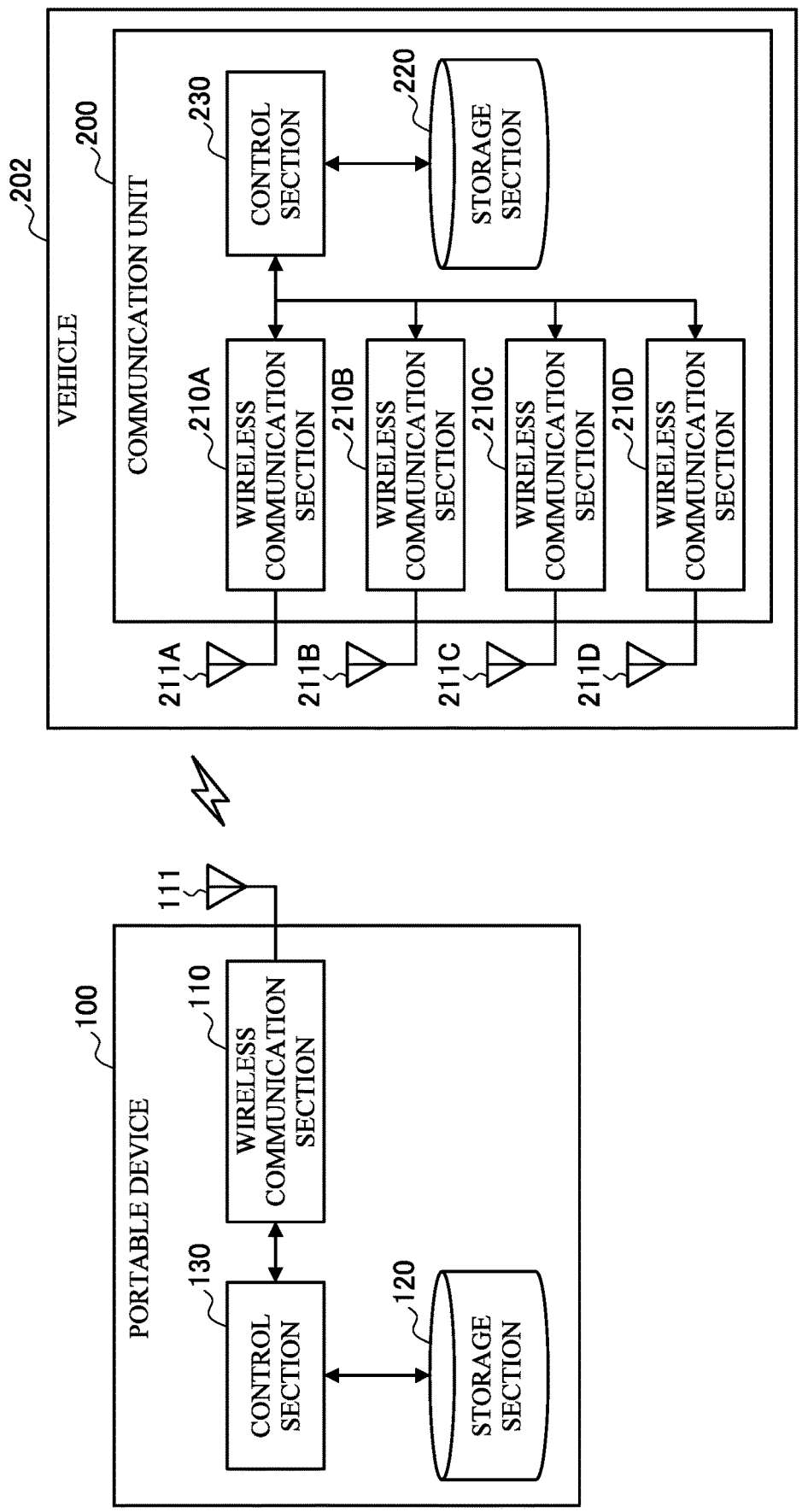
FIG. 1 is a diagram illustrating an example of a configuration of a system according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Further, in the present specification and the drawings, different alphabets are suffixed to a same reference numeral to distinguish elements which have substantially the same functional configuration. For example, a plurality of elements which have substantially the same functional configuration are distinguished such as wireless communication sections 210A, 210B, and 210C, as necessary. However, when there is no need in particular to distinguish structural elements that have substantially the same functional configuration, the same reference numeral alone is attached. For example, in a case in which it is not necessary to particularly distinguish the wireless communication sections 210A, 210B, and 210C, the wireless communication sections 210A, 210B, and 210C are simply referred to as the wireless communication sections 210.

1. Configuration Example

FIG. 1 is a diagram illustrating an example of a configuration of a system 1 according to an embodiment of the present invention. As illustrated in FIG. 1, the system 1 according to the present embodiment includes a portable device 100 and a communication unit 200. The communication unit 200 according to the present embodiment is installed in a vehicle 202. The vehicle 202 is an example of a usage target of the user.

A communication device of an authenticatee and a communication device of an authenticator are involved in the present embodiment. In the example illustrated in FIG. 1, the portable device 100 is an example of the communication device of the authenticatee, and the communication unit 200 is an example of the communication device of the authenticator.

When a user (for example, a driver of the vehicle 202) carrying the portable device 100 approaches the vehicle 202, the system 1 performs wireless communication for authentication between the portable device 100 and the communication unit 200 installed in the vehicle 202. Next, when the authentication succeeds, the vehicle 202 becomes available for the user by unlocking a door lock of the vehicle 202 or starting an engine of the vehicle 202. The system 1 is also referred to as a smart entry system. Next, respective structural elements will be described sequentially.

(1) Portable Device 100

The portable device 100 is configured as any device to be carried by the user. Examples of the any device include an electronic key, a smartphone, a wearable terminal, and the like. As illustrated in FIG. 1, the portable device 100 includes a wireless communication section 110, a storage section 120, and a control section 130.

The wireless communication section 110 has a function of performing wireless communication with the communication unit 200 installed in the vehicle 202. The wireless communication section 110 wirelessly receives a signal from the communication unit 200 installed in the vehicle 202. In addition, the wireless communication section 110 wirelessly transmits a signal to the communication unit 200.

Wireless communication is performed between the wireless communication section 110 and the communication unit 200 by using an ultra-wideband (UWB) signal, for example. In the wireless communication of the UWB signal, it is possible for impulse UWB to measure propagation delay time of a radio wave with high accuracy by using the radio wave of ultra-short pulse width of a nanosecond or less, and it is possible to perform ranging with high accuracy on the basis of the propagation delay time. Note that, the propagation delay time is time from transmission to reception of the radio wave. The wireless communication section 110 is configured as a communication interface that makes it possible to perform communication by using the UWB signals, for example.

Note that, the UWB signal may be transmitted/received as a ranging signal, an angle estimation signal, and a data signal, for example. The ranging signal is a signal transmitted and received in the ranging process (to be described later). The ranging signal may be configured in a frame format that does not include a payload part for storing data or in a frame format that includes the payload part. The angle estimation signal is a signal transmitted and received in an angle estimation process (to be described later). The angle estimation signal may be configured in a way similar to the ranging signal. The data signal is preferably configured in the frame format that includes the payload part for storing the data.

Here, the wireless communication section 110 includes at least one antenna 111. In addition, the wireless communication section 110 transmits/receives a wireless signal via the at least one antenna 111.

The storage section 120 has a function of storing various kinds of information for operating the portable device 100. For example, the storage section 120 stores a program for operating the portable device 100, and an identifier (ID), password, and authentication algorithm for authentication, or the like. For example, the storage section 120 includes a storage medium such as flash memory and a processing device that performs recording/playback on/of the storage medium.

The control section 130 has a function of executing processes in the portable device 100. For example, the control section 130 controls the wireless communication section 110 to perform communication with the communication unit 200 of the vehicle 202. The control section 130 reads information from the storage section 120 and writes information into the storage section 120. The control section 130 also functions as an authentication control section that controls an authentication process between the portable device 100 and the communication unit 200 of the vehicle 202. For example, the control section 130 may include a central processing unit (CPU) and an electronic circuit such as a microprocessor.

(2) Communication Unit 200

The communication unit 200 is prepared in association with the vehicle 202. Here, it is assumed that the communication unit 200 is installed in the vehicle 202 in such a manner that communication section 200 is installed in a vehicle interior of the vehicle 202, the communication section 200 is built in the vehicle 202 as a communication module, or in other manners. Alternatively, the communication unit 200 may be prepared as a separate object from the vehicle 202 in such a manner that the communication unit 200 is installed in a parking space for the vehicle 202 or in other manners. In this case, the communication unit 200 may wirelessly transmit a control signal to the vehicle 202 on the basis of a result of communication with the portable device 100 and may remotely control the vehicle 202. As illustrated in FIG. 1, the communication unit 200 includes a plurality of wireless communication sections 210 (210A to 210D), a storage section 220, and a control section 230.

The wireless communication section 210 has a function of performing wireless communication with the wireless communication section 110 of the portable device 100. The wireless communication section 210 wirelessly receives a signal from the portable device 100. In addition, the wireless communication section 210 wirelessly transmits a signal to the portable device 100. The wireless communication section 210 is configured as a communication interface that makes it possible to perform communication by using the UWB signals, for example.

Here, each of the wireless communication sections 210 includes an antenna 211. In addition, each of the wireless communication sections 210 transmits/receives a wireless signal via the antenna 211.

The storage section 220 has a function of storing various kinds of information for operating the communication unit 200. For example, the storage section 220 stores a program for operating the communication unit 200, an authentication algorithm, and the like. For example, the storage section 220 includes a storage medium such as flash memory and a processing device that performs recording/playback on/of the storage medium.

The control section 230 has a function of controlling overall operation performed by the communication unit 200 and in-vehicle equipment installed in the vehicle 202. For example, the control section 230 controls the wireless communication sections 210 to perform communication with the portable device 100. The control section 230 reads information from the storage section 220 and writes information into the storage section 220. The control section 230 also functions as an authentication control section that controls the authentication process between the portable device 100 and the communication unit 200. In addition, the control section 230 also functions as a door lock control section that controls the door key of the vehicle 202, and locks and unlocks doors with the door key. The control section 230 also functions as an engine control section that controls the engine of the vehicle 202, and starts/stops the engine. Note that, a motor or the like may be installed as a power source in the vehicle 202 in addition to the engine. For example, the control section 230 is configured as an electronic circuit such as an electronic control unit (ECU).

2. Estimation of Positional Parameter

<2.1. Positional Parameter>

The communication unit 200 (specifically, control section 230) according to the present embodiment performs a positional parameter estimation process of estimating a positional parameter that represents a position of the portable device 100. Hereinafter, with reference to FIG. 2 to FIG. 4, various definitions related to the positional parameter will be described.

Figure 2:
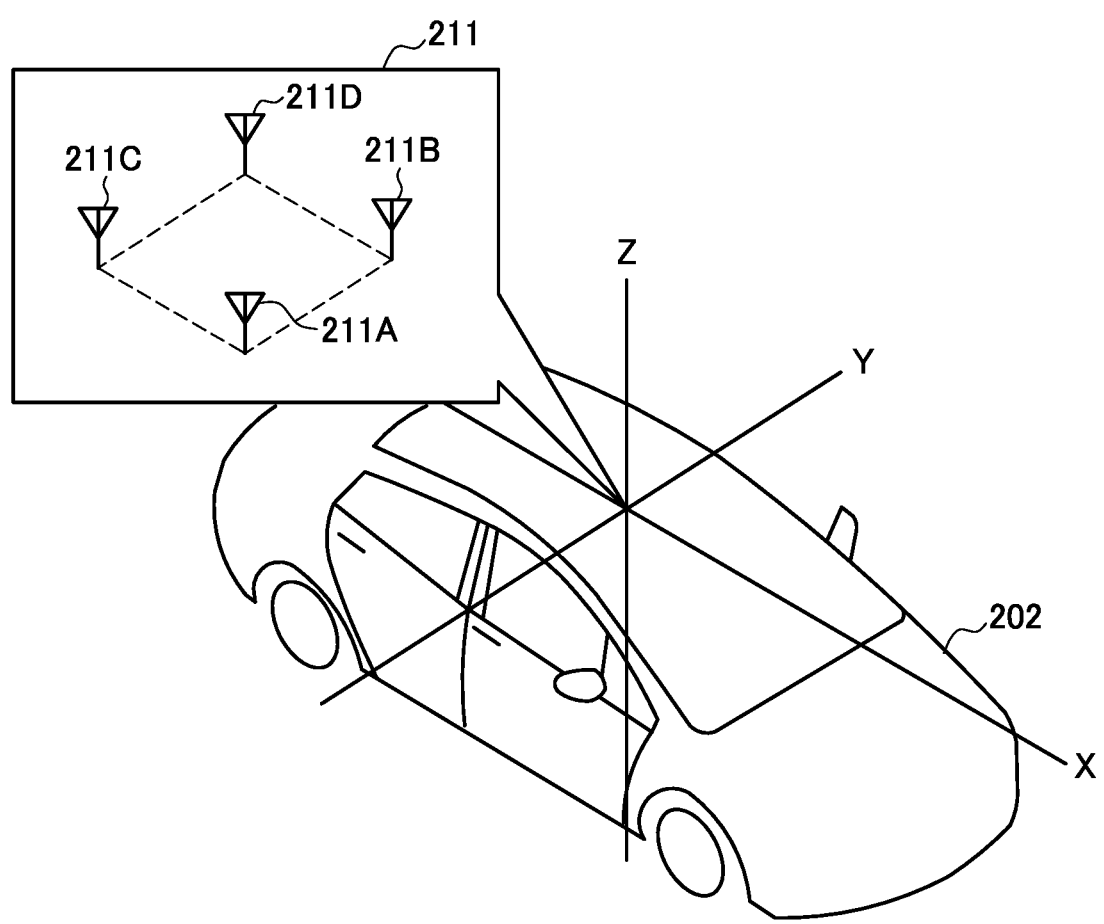
FIG. 2 is a diagram illustrating an example of arrangement of a plurality of antennas installed in a vehicle according to the embodiment.

FIG. 2 is a diagram illustrating an example of arrangement of the plurality of antennas 211 (wireless communication sections 210) installed in the vehicle 202 according to the present embodiment. As illustrated in FIG. 2, the four antennas 211 (211A to 211D) are installed on a ceiling of the vehicle 202. The arrangement positions of the antennas 211 are arrangement positions of the wireless communication sections 210. The antenna 211A is installed on a front right side of the vehicle 202. The antenna 211B is installed on a front left side of the vehicle 202. The antenna 211C is installed on a rear right side of the vehicle 202. The antenna 211D is installed on a rear left side of the vehicle 202. Note that, a distance between adjacent antennas 211 are set to half or less of wavelength $\lambda$ of a carrier wave of an angle estimation signal (to be described later). A local coordinate system of the communication unit 200 is set as a coordinate system based on the communication unit 200. An example of the local coordinate system of the communication unit 200 has its origin at the center of the four antennas 211. This local coordinate system has its X axis along a front-rear direction of the vehicle 202, its Y axis along a left-right direction of the vehicle 202, and its Z axis along an up-down direction of the vehicle 202. Note that, the X axis is parallel to a line connecting a pair of the antennas in the front-rear direction (such as a pair of the antenna 211A and the antenna 211C, and a pair of the antenna 211B and the antenna 211D). In addition, the Y axis is parallel to a line connecting a pair of the antennas in the left-right direction (such as a pair of the antenna 211A and the antenna 211B, and a pair of the antenna 211C and the antenna 211D).

Note that, the arrangement of the four antennas is not limited to the square shape. The arrangement of the four antennas may be a parallelogram shape, a trapezoid shape, a rectangular shape, or any other shapes. Of course, the number of antennas 211 is not limited to four.

Figure 3:
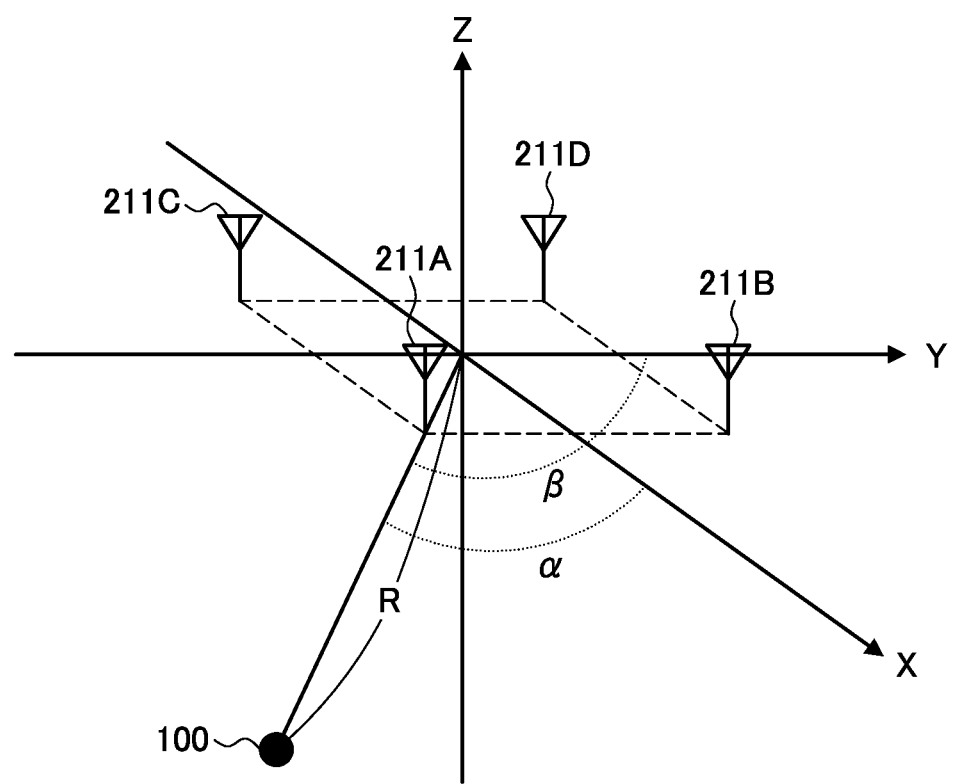
FIG. 3 is a diagram illustrating an example of a positional parameter of a portable device according to the embodiment.

FIG. 3 is a diagram illustrating an example of positional parameters of the portable device 100 according to the present embodiment. The positional parameters may include a distance R between the portable device 100 and the communication unit 200. The distance R illustrated in FIG. 3 is a distance from the origin of the local coordinate system of the communication unit 200 to the portable device 100. The distance R is estimated on the basis of a result of transmission/reception of a ranging signal (to be described later) between the portable device 100 and one of the plurality of wireless communication sections 210. The distance R may be a distance between the portable device 100 and the single wireless communication section 210 that transmits/receives the ranging signal (to be described later).

In addition, as illustrated in FIG. 3, the positional parameters may include an angle of the portable device 100 based on the communication unit 200, the angle including an angle α between the X axis and the portable device 100 and an angle β between the Y axis and the portable device 100. The angles α and β are angles between the coordinate axes of a first predetermined coordinate system and a straight line connecting the portable device 100 with the origin on the first predetermined coordinate system. For example, the first predetermined coordinate system is the local coordinate system of the communication unit 200. The angle α is an angle between the X axis and the straight line connecting the portable device 100 with the origin. The angle β is an angle between the Y axis and the straight line connecting the portable device 100 with the origin.

Figure 4:
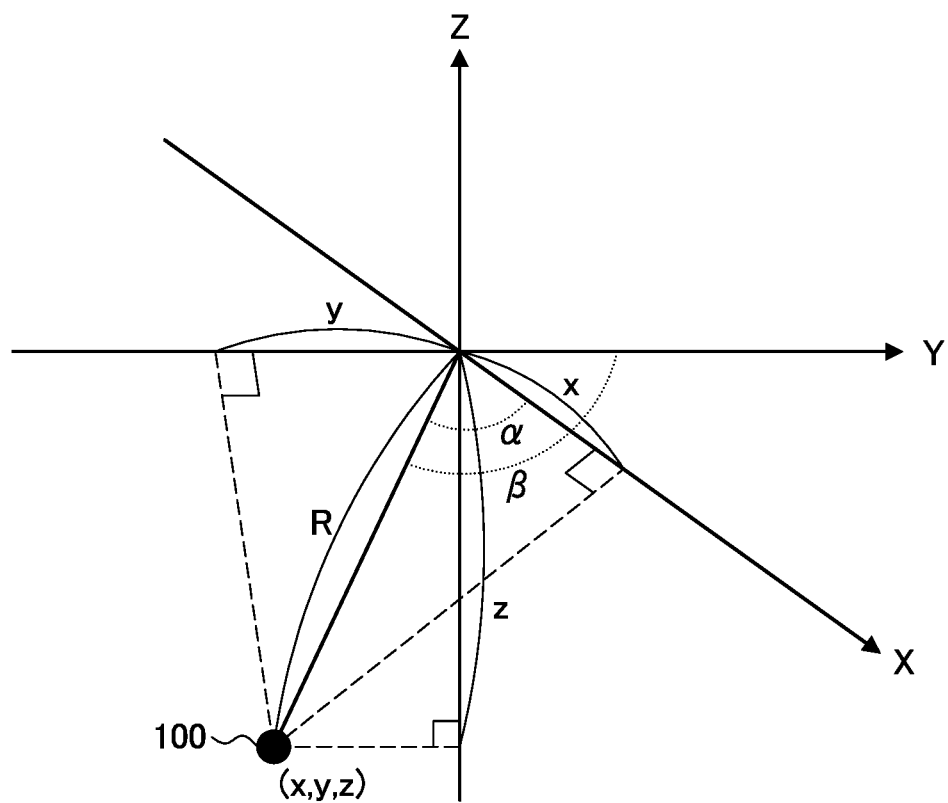
FIG. 4 is a diagram illustrating an example of a positional parameter of the portable device according to the embodiment.

FIG. 4 is a diagram illustrating an example of positional parameters of the portable device 100 according to the present embodiment. The positional parameters may include coordinates of the portable device 100 in a second predetermined coordinate system. In FIG. 4, a coordinate x on the X axis, a coordinate y on the Y axis, and a coordinate z on the Z axis of the portable device 100 are an example of such coordinates. In other words, the second predetermined coordinate system may be the local coordinate system of the communication unit 200. Alternatively, the second predetermined coordinate system may be a global coordinate system.

<2.2. CIR>

(1) CIR Calculation Process

In the positional parameter estimation process, the portable device 100 and the communication unit 200 communicate with each other to estimate the positional parameters. At this time, the portable device 100 and the communication unit 200 calculates channel impulse responses (CIRs).

The CIR is a response obtained when an impulse is input to the system. In the case where a wireless communication section of one of the portable device 100 and the communication unit 200 (hereinafter, also referred to as a transmitter) transmits a signal including a pulse, the CIR according to the present embodiment is calculated on the basis of the signal received by a wireless communication section of the other (hereinafter, also referred to as a receiver). The pulse is a signal including variation in amplitude. Hereinafter, a signal transmitted from the transmitter is referred to as a transmission signal. In addition, a signal received by the receiver is referred to as a reception signal.

Here, sometimes the reception signal is different from the transmission signal due to influence of the obstacle or the like interposed between the transmitter and the receiver. The CIR is calculated on the basis of the transmission signal and the reception signal. In other words, the CIR is calculated on the basis of the reception signal that is a signal that corresponds to the transmission signal and that is received by the wireless communication section of the receiver in the case where the wireless communication section of the transmitter transmits the transmission signal. Note that, the transmission signal is known to the receiver. It can be said that the CIR indicates characteristics of a wireless communication path between the portable device 100 and the communication unit 200.

For example, the CIR may be a correlation computation result that is a result obtained by correlating the transmission signal with the reception signal at each delay time that is time elapse after the transmitter transmits the transmission signal. Here, the correlation may be sliding correlation that is a process of correlating the transmission signal with the reception signal by shifting relative positions of the signals in time directions. The correlation computation result includes a correlation value indicating a degree of the correlation between the transmission signal and the reception signal as an element obtained at each delay time. Each of a plurality of the elements included in the correlation computation result is information including a combination of the delay time and the correlation value. The correlation may be calculated at each delay time between designated intervals. In other words, the CIR may be a result of correlating the transmission signal with the reception signal at the designated intervals after the transmitter transmits the transmission signal. Here, the designated interval is an interval between timings at which the receiver samples the reception signal, for example. Therefore, an element included in the CIR is also referred to as a sampling point. The correlation value includes at least any of an amplitude component and a phase component. The amplitude component is amplitude or electric power obtained by squaring the amplitude. The phase component is an angle between IQ components of a CIR and an I axis on an IQ plane. The phase component may be simply referred to as a phase. The correlation value may be a complex number including the IQ components.

A value obtained at each delay time of the CIR is also referred to as a CIR value. In other words, the CIR is chronological variation in the CIR value. In the case where the CIR is the correlation computation result, the CIR value is a correlation value obtained at each delay time.

In the case where the CIR is the correlation computation result, the receiver calculates the CIR by correlating the transmission signal with the reception signal through the sliding correlation. For example, the receiver calculates a value obtained by correlating the reception signal with the transmission signal delayed by a certain delay time, as characteristics (that is, a CIR value) at the delay time. Next, the receiver calculates the CIR value at each delay time to calculate the CIR. Hereinafter, it is assumed that the CIR is the correlation computation result.

Note that, the CIR is also referred to as delay profile in a ranging technology using the UWB. In particular, the CIR using electric power as the CIR value is referred to as power delay profile.

Hereinafter, with reference to FIG. 5 to FIG. 6, a CIR calculation process performed in the case where the portable device 100 serves as the transmitter and the communication unit 200 serves as the receiver will be described in detail.

Figure 5:
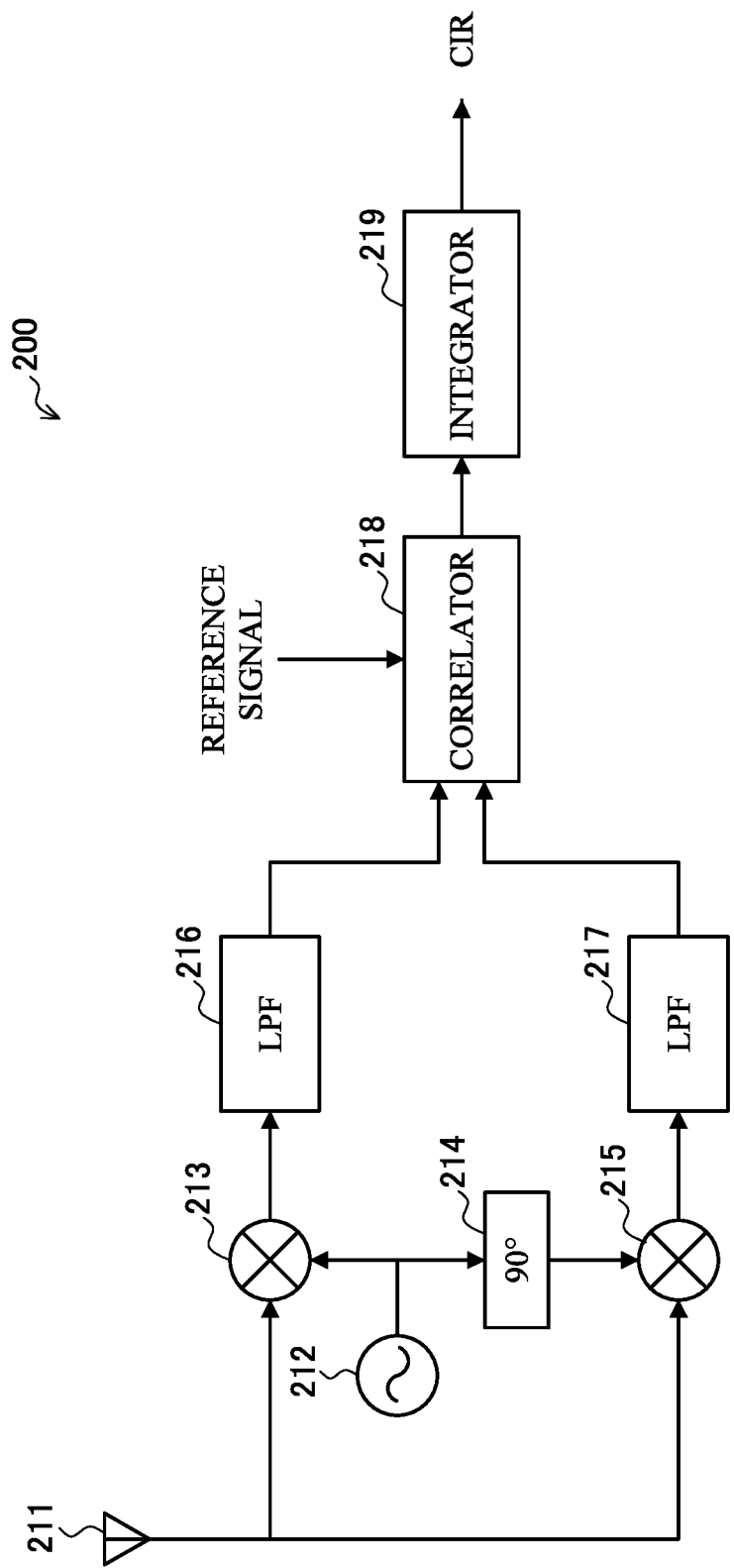
FIG. 5 is a diagram illustrating an example of processing blocks for signal processing in a communication unit according to the embodiment.

FIG. 5 is a diagram illustrating an example of processing blocks for signal processing in the communication unit 200 according to the present embodiment. As illustrated in FIG. 5, the communication unit 200 includes an oscillator 212, a multiplier 213, a 90-degree phase shifter 214, a multiplier 215, a low pass filter (LPF) 216, a LPF 217, a correlator 218, and an integrator 219.

The oscillator 212 generates a signal of same frequency as frequency of a carrier wave that carries a transmission signal, and outputs the generated signal to the multiplier 213 and the 90-degree phase shifter 214.

The multiplier 213 multiplies a reception signal received by the antenna 211 and the signal output from the oscillator 212, and outputs a result of the multiplication to the LPF 216. Among input signals, the LPF 216 outputs a signal of lower frequency than the frequency of the carrier wave that carries the transmission signal, to the correlator 218. The signal input to the correlator 218 is an I component (that is, a real part) among components corresponding to an envelope of the reception signal.

The 90-degree phase shifter 214 delays the phase of the input signal by 90 degrees, and outputs the delated signal to the multiplier 215. The multiplier 215 multiplies the reception signal received by the antenna 211 and the signal output from the 90-degree phase shifter 214, and outputs a result of the multiplication to the LPF 217. Among input signals, the LPF 217 outputs a signal of lower frequency than the frequency of the carrier wave that carries the transmission signal, to the correlator 218. The signal input to the correlator 218 is a Q component (that is, an imaginary part) among the components corresponding to the envelope of the reception signal.

The correlator 218 calculates the CIR by correlating a reference signal with the reception signals including the I component and the Q component output from the LPF 216 and the LPF 217 through the sliding correlation. Note that, the reference signal described herein is the same signal as the transmission signal before multiplying the carrier wave.

The integrator 219 integrates the CIRs output from the correlator 218, and outputs the integrated CIRs.

Here, the transmitter may transmit a signal including a preamble as the transmission signal. The preamble is a sequence known to the transmitter and the receiver. Typically, the preamble is arranged at a head of the transmission signal. The preamble includes one or more preamble symbols. The preamble symbol is a pulse sequence including one or more pulses. The pulse sequence is a set of the plurality of pulses that are separate from each other in the time direction.

The preamble symbol is a target of integration performed by the integrator 219. Therefore, the correlator 218 calculates the CIR for each of the one or more preamble symbols by correlating a portion corresponding to a preamble symbol included in the reception signal with a preamble symbol included in the transmission signal with regard to each of portions corresponding to the one or more preamble symbols included in the reception signal, at the designated intervals after the portable device 100 transmits the preamble symbol. Next, the integrator 219 obtains integrated CIRs by integrating the CIRs of the respective preamble symbols with regard to the one or more preamble symbols included in the preamble. Next, the integrator 219 outputs the integrated CIRs. Hereinafter, the CIR means the integrated CIRs unless otherwise noted.

The CIR of each preamble symbol is an example of the first correlation computation result. The integrated CIRs are an example of the second correlation computation result. As described above, the CIR includes a correlation value indicating a degree of the correlation between the transmission signal and the reception signal as an element obtained at each delay time, which is time elapsed after the transmitter transmits the transmission signal. From a viewpoint of the preamble symbol, the CIR includes the correlation value indicating a degree of the correlation between the transmission signal and the reception signal as an element obtained at each delay time, which is time elapsed after the transmitter transmits each preamble symbol.

Here, the portable device 100 and the communication unit 200 acquire time by using a time counter. The time counter is a counter for acquiring time. The counter is a counting function. A value of the time counter (hereinafter, referred to as a counter value) is incremented each time unit time elapses. The unit time is prescribed period of time. This allows the portable device 100 and the communication unit 200 to acquire time on the basis of the counter value and the unit time. Note that, here, the time is relative time based on criterial time. For example, the criterial time is time acquired when the counter value is zero. In addition, for example, the unit time is the designated interval.

A time counter of the portable device 100 may be synchronous with a time counter of the communication unit 200. The case where the time counters are synchronous with each other means that they have identical unit time and criterial time. The time counter of the portable device 100 may be non-synchronous with the time counter of the communication unit 200. The case where the time counters are no-synchronous with each other means disagreement between the portable device 100 and the communication unit 200 over at least any of the unit time or the criterial time.

The time counters of the plurality of wireless communication sections 210 may be synchronous with each other. In the case where the time counters are not synchronous with each other, time axes of a plurality of CIRs calculated with regard to the plurality of wireless communication sections 210 are also non-synchronous with each other (that is, the time axes are not identical). The time counters of the plurality of wireless communication sections 210 may be non-synchronous with each other. In the case where the time counters are synchronous with each other, the time axes of the plurality of CIRs calculated with regard to the plurality of wireless communication sections 210 are also synchronous with each other (that is, the time axes are identical).

Time acquired using the time counters corresponds to the above-described delay time. This is because the delay time is time obtained by subtracting time when the transmitter transmits the transmission signal from time acquired from the time counters. Therefore, the CIR may be treated as chronological variation in the CIR values obtained at respective points of time acquired from the time counters. In this case, a time axis of CIR of respective preamble symbols of a preamble symbol that is initially received is used as a time axis of the integrated CIRs.

(2) Example of CIR

Figure 6:
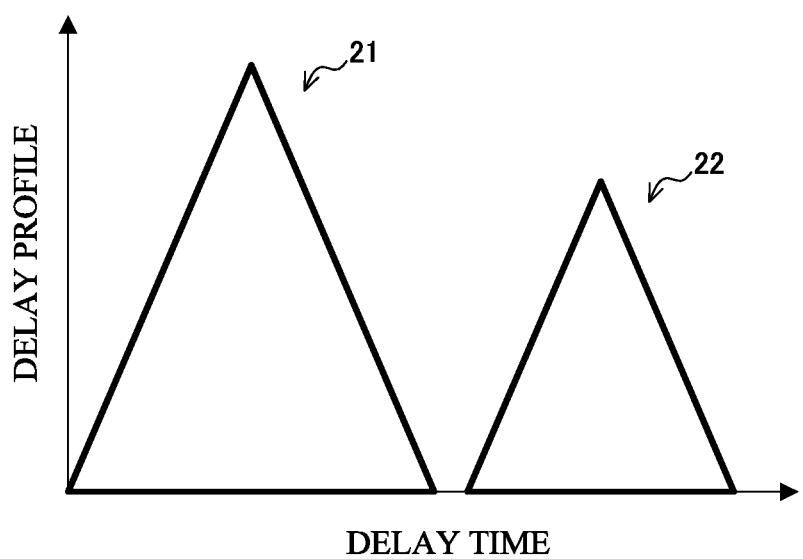
FIG. 6 is a graph illustrating an example of CIR according to the embodiment.

FIG. 6 illustrates an example of the CIR output from the integrator 219. FIG. 6 is a graph illustrating the example of CIR according to the present embodiment. The graph includes a horizontal axis representing delay time. The graph includes a vertical axis representing absolute values of CIR values (such as amplitude or electric power). Note that, the shape of CIR, more specifically, the shape of chronological change in the CIR value may also be referred to as a CIR waveform. Typically, a set of elements obtained between a zero-crossing and another zero-crossing corresponds to a single pulse with regard to the CIR. The zero-crossing is an element whose value is zero. However, the same does not apply to an environment with noise. For example, a set of elements obtained between intersections of a standard with chronological variation in the CIR value may be treated as corresponding to the single pulse. The CIR illustrated in FIG. 6 include a set 21 of elements corresponding to a certain pulse, and a set 22 of elements corresponding to another pulse.

Here, sometimes multipath may be caused. The multipath is a situation where a receiver receives a plurality of radio waves transmitted from a single transmitter. The multipath is caused in the case where there are a plurality of paths between the transmitter and the receiver. In the case where the multipath is caused, sometimes signals that have passed through different paths arrive at the receiver at different timing, or the signal may arrive at overlapping timings and may be received in a state where the signals interfere with each other.

For example, the set 21 corresponds to a signal (such as pulse) that reaches the receiver through a first path. The first path is a shortest path between the transmitter and the receiver. In an environment that includes no obstacle, the first path is a straight path between the transmitter and the receiver. For example, the set 22 corresponds to a signal (such as pulse) that reaches the receiver through a path other than the first path. As described above, the signals that have passed through different paths are also referred to as multipath waves.

(3) Detection of First Incoming Wave

Among wireless signals received from the transmitter, the receiver detects a signal that meets a predetermined detection standard as a signal that reaches the receiver through the first path. Next, the receiver estimates the positional parameters on the basis of the detected signal.

Hereinafter, the signal detected as the signal that reaches the receiver through the first path is also referred to as the first incoming wave. The first incoming wave may be any of a direct wave, a delayed wave, or a combined wave. The direct wave is a signal that passes through a shortest path between the transmitter and the receiver, and is received by the receiver. In other words, the direct wave is a signal that reaches the receiver through the first path. The delayed wave is a signal that passes through a path different from the shortest path between the transmitter and the receiver, that is, through a path other than the first path. The delayed wave is received by the receiver after getting delayed in comparison with the direct wave. The combined wave is a signal received by the receiver in a state of combining a plurality of signals that have passed through a plurality of different paths.

The receiver detects a signal that meets a predetermined detection standard as the first incoming wave, among the received wireless signals. For example, the predetermined detection standard is a condition that the CIR value (such as amplitude or electric power) exceeds a predetermined threshold for the first time. In other words, the receiver may detect a pulse corresponding to a portion of the CIR obtained when the CIR value exceeds the predetermined threshold for the first time, as the first incoming wave.

Here, it should be noted that the signal detected as the first incoming wave is not necessarily the direct wave. For example, if the direct wave is received in a state where the direct wave and the delayed wave annihilate each other, sometimes the CIR value falls below the predetermined threshold and the direct wave is not detected as the first incoming wave. In this case, the combined wave or the delayed wave coming while being delayed behind the direct wave is detected as the first incoming wave.

Hereinafter, the predetermined threshold used for detecting the first incoming wave is also referred to as a first path threshold.

—Reception Time of First Incoming Wave

The receiver may treat the time of meeting the predetermined detection standard as the time of receiving the first incoming wave. For example, the reception time of the first incoming wave is time corresponding to delayed time of an element whose CIR value exceeds the first path threshold for the first time.

Alternatively, the receiver may treat time of obtaining a peak of the detected first incoming wave as the reception time of the first incoming wave. In this case, for example, the reception time of the first incoming wave is time corresponding to delayed time of an element having highest amplitude or electric power as the CIR value, among the set of elements corresponding to the first incoming wave with regard to the CIR.

Here, the wireless communication section 210 receives a plurality of pulses that are transmitted as the transmission signals from the portable device 100 through a plurality of paths, as the reception signals. The reception time of the first incoming wave is pulse reception time that is time when the wireless communication section 210 receives a pulse included in the reception signal. In particular, it can be said that the reception time of the first incoming wave is pulse reception time of a pulse detected for the first time, among the plurality of pulses coming through the plurality of paths.

Hereinafter, it is assumed that the reception time of the first incoming wave is time corresponding to delayed time of an element whose CIR value exceeds the first path threshold for the first time.

—Phase of First Incoming Wave

The receiver may treat a phase obtained at time of meeting the predetermined detection standard as a phase the first incoming wave. For example, the phase of the first incoming wave is a phase serving as a CIR value of an element whose CIR value exceeds the first path threshold for the first time.

Alternatively, the receiver may treat a phase of the peak of the detected first incoming wave as the phase of the first incoming wave. In this case, for example, the phase of the first incoming wave is the phase serving as a CIR value of an element having highest amplitude or electric power as the CIR value, among the set of elements corresponding to the first incoming wave with regard to the CIR.

Hereinafter, it is assumed that the phase of the first incoming wave is a phase serving as a CIR value of an element whose CIR value exceeds the first path threshold for the first time.

Width of First Incoming Wave

The width of the set of elements corresponding to the first incoming wave in the time direction is also referred to as the width of the first incoming wave. For example, the width of the first incoming wave is the width between a zero-crossing and another zero-crossing of the CIR in the time direction. For another example, the width of the first incoming wave is width between intersections of a standard with chronological variation in the CIR value in the time direction.

The width of a pulse included in the transmission signal in the time direction is also referred to as the width of the pulse. For example, the width of the pulse is the width between a zero-crossing and another zero-crossing of chronological variation in the CIR value in the time direction. For another example, the width of the pulse is width between intersections of a standard with chronological variation in the CIR value in the time direction.

In the case where only the direct wave is detected as the first incoming wave, the first incoming wave of the CIR has an ideal width. The ideal width obtained when only the direct wave is detected as the first incoming wave can be calculated through theoretical calculation using waveform of the transmission signal, a reception signal processing method, and the like. On the other hand, in the case where a combined wave is received as the first incoming wave, the width of the first incoming wave of the CIR may be different from the ideal width. For example, in the case where a combined wave in which a delayed wave having a same phase as the direct wave and the direct wave are combined is detected as the first incoming wave, a portion corresponding to the direct wave and a portion corresponding to the delayed wave are added in a state where they are shifted in the time direction. Therefore, the portions reinforce each other, and the first incoming wave in the CIR has a wider width. On the other hand, in the case where a combined wave in which a delayed wave having an opposite phase from the direct wave and the direct wave are combined is detected as the first incoming wave, the direct wave and the delayed wave annihilate each other. Therefore, the first incoming wave in the CIR has a narrower width.

<2.3. Estimation of Positional Parameter>

(1) Ranging

The communication unit 200 performs the ranging process. The ranging process is a process of estimating a distance between the communication unit 200 and the portable device 100. For example, the distance between the communication unit 200 and the portable device 100 is the distance R illustrated in FIG. 3. The ranging process includes transmission/reception of a ranging signal and calculation of the distance R based on propagation delay time of the ranging signal. The ranging signal is a signal used for ranging among signals transmitted/received between the portable device 100 and the communication unit 200. The propagation delay time is time from transmission to reception of the signal.

Here, the ranging signal is transmitted/received by one of the plurality of wireless communication sections 210 of the communication unit 200. Hereinafter, the wireless communication section 210 that transmits/receives the ranging signal is also referred to as a master. The distance R is a distance between the wireless communication section 210 serving as the master (more precisely, the antenna 211) and the portable device 100 (more precisely, the antenna 111). In addition, the wireless communication sections 210 other than the wireless communication section 210 that transmits/receives the ranging signal are referred to as slaves.

In the ranging process, a plurality of the ranging signals may be transmitted and received between communication unit 200 and the portable device 100. Among the plurality of ranging signals, a ranging signal transmitted from one device to the other device is also referred to as a first ranging signal. Next, a ranging signal transmitted as a response to the first ranging signal from the device that has received the first ranging signal to the device that has transmitted the first ranging signal is also referred to as a second ranging signal. In addition, a ranging signal transmitted as a response to the second ranging signal from the device that has received the second ranging signal to the device that has transmitted the second ranging signal is also referred to as a third ranging signal.

Next, with reference to FIG. 7, an example of a flow of the ranging process will be described.

Figure 7:
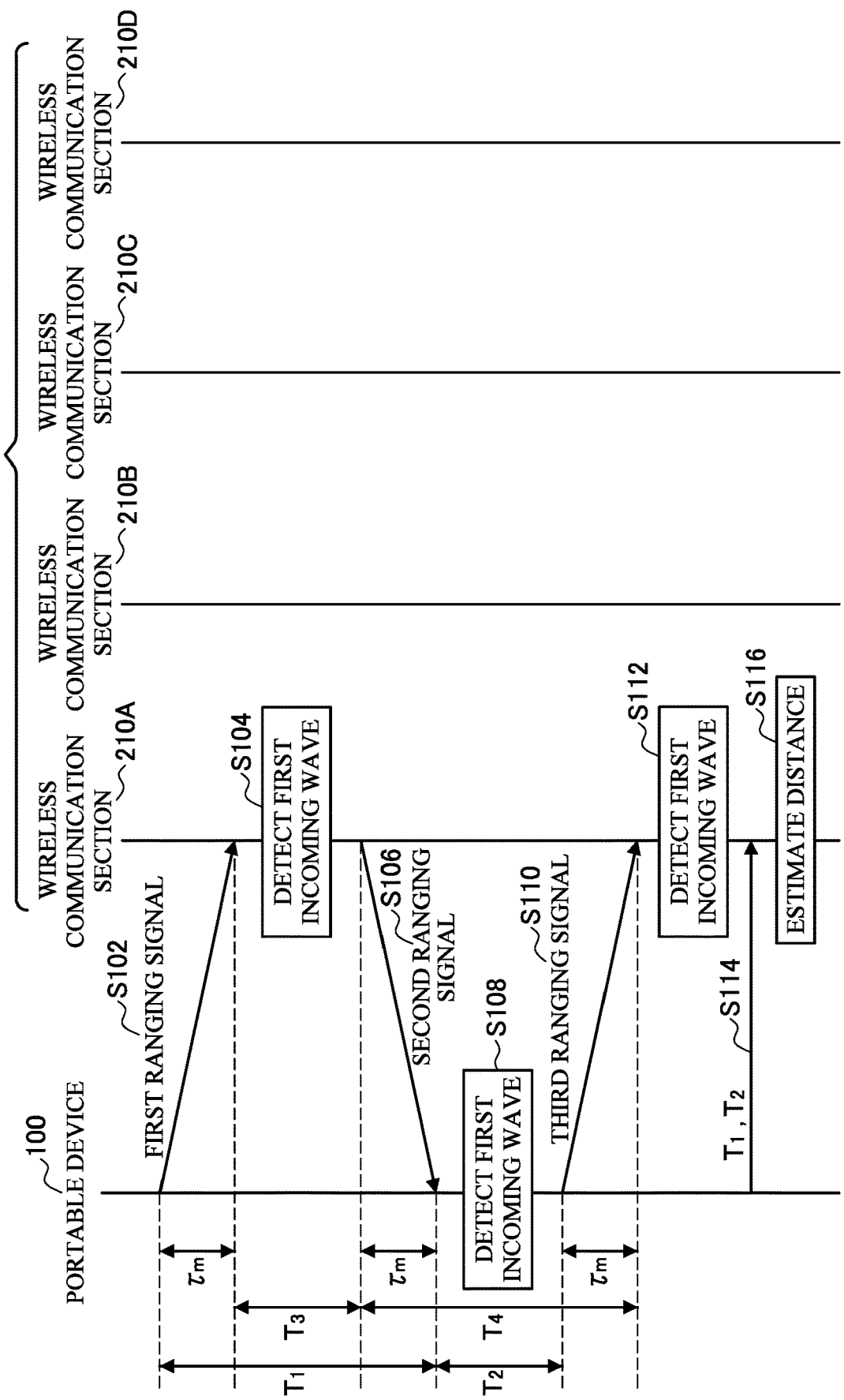
FIG. 7 is a sequence diagram illustrating an example of a flow of a ranging process executed in the system according to the embodiment.

FIG. 7 is a sequence diagram illustrating the example of the flow of the ranging process executed in the system 1 according to the present embodiment. The portable device 100 and the communication unit 200 are involved in this sequence. It is assumed that the wireless communication section 210A functions as the master in this sequence.

As illustrated in FIG. 7, the portable device 100 first transmits the first ranging signal (Step S102). When the wireless communication section 210A receives the first ranging signal, the control section 230 calculates a CIR of the first ranging signal. Next, the control section 230 detects a first incoming wave of the first ranging signal of the wireless communication section 210A on the basis of the calculated CIR (Step S104).

Next, the wireless communication section 210A transmits the second ranging signal in response to the first ranging signal (Step S106). When the second ranging signal is received, the portable device 100 calculates a CIR of the second ranging signal. Next, the portable device 100 detects a first incoming wave of the second ranging signal on the basis of the calculated CIR (Step S108).

Next, the portable device 100 transmits the third ranging signal in response to the second ranging signal (Step S110). When the wireless communication section 210A receives the third ranging signal, the control section 230 calculates a CIR of the third ranging signal. Next, the control section 230 detects a first incoming wave of the third ranging signal of the wireless communication section 210A on the basis of the calculated CIR (Step S112).

The portable device 100 measures time $T_1$ from transmission time of the first ranging signal to reception time of the second ranging signal, and time $T_2$ from reception time of the second ranging signal to transmission time of the third ranging signal. Here, the reception time of the second ranging signal is reception time of the first incoming wave of the second ranging signal detected in Step S108. Next, the portable device 100 transmits a signal including information indicating the time $T_1$ and the time $T_2$ (Step S114). For example, such a signal is received by the wireless communication section 210A.

The control section 230 measures a time $T_3$ from reception time of the first ranging signal to transmission time of the second ranging signal, and time $T_4$ from transmission time of the second ranging signal to reception time of the third ranging signal. Here, the reception time of the first ranging signal is reception time of the first incoming wave of the first ranging signal detected in Step S104. In a similar way, the reception time of the third ranging signal is reception time of the first incoming wave of the third ranging signal detected in Step S112.

Next, the control section 230 estimates the distance R on the basis of the time periods $T_1$, $T_2$, $T_3$, and $T_4$ (Step S116). For example, the control section 230 estimates propagation delay time $\tau_m$ by using an equation listed below.

$$\tau_m = \frac{T_1 \times T_4 - T_2 \times T_3}{T_1 + T_2 + T_3 + T_4} \qquad (1)$$

Next, the control section 230 estimates the distance R by multiplying the estimated propagation delay time $\tau_m$ by speed of the signal.

—Cause of Reduction in Accuracy of Estimation

The reception times of the ranging signals serving as start or end of the time periods $T_1$, $T_2$, $T_3$, and $T_4$ are reception times of the first incoming waves of the ranging signals. As described above, the signal detected as the first incoming wave is not necessarily the direct wave.

In the case where the combined wave or the delayed wave coming while being delayed behind the direct wave is detected as the first incoming wave, reception time of the first incoming wave varies in comparison with the case where the direct wave is detected as the first incoming wave. In this case, the propagation delay time $\tau_m$ is changed from a true value (propagation delay time $\tau_m$ obtained in the case where the direct wave is detected as the first incoming wave). In addition, this change deteriorates accuracy of estimating the distance R (hereinafter, also referred to as ranging accuracy).

Specifically, in the case where the direct wave is not detected as the first incoming wave, the combined wave or the delayed wave coming while being delayed behind the direct wave is detected as the first incoming wave. Therefore, the reception time of the first incoming wave is delayed. As a result, the propagation delay time $\tau_m$ obtained in the case where the direct wave is not detected as the first incoming wave is longer than the propagation delay time $\tau_m$ obtained in the case where the direct wave is detected as the first incoming wave. Next, because the propagation delay time $\tau_m$ is longer than the true value, the distance R is estimated as a distance longer than the true value.

(2) Angle Estimation

The communication unit 200 performs the angle estimation process. The angle estimation process is a process of estimating the angles α and β illustrated in FIG. 3. The angle estimation process includes reception of an angle estimation signal and calculation of the angles α and β on the basis of a result of reception of the angle estimation signal. The angle estimation signal is a signal used for estimating an angle among signals transmitted/received between the portable device 100 and the communication unit 200. Next, with reference to FIG. 8, an example of a flow of the angle estimation process will be described.

Figure 8:
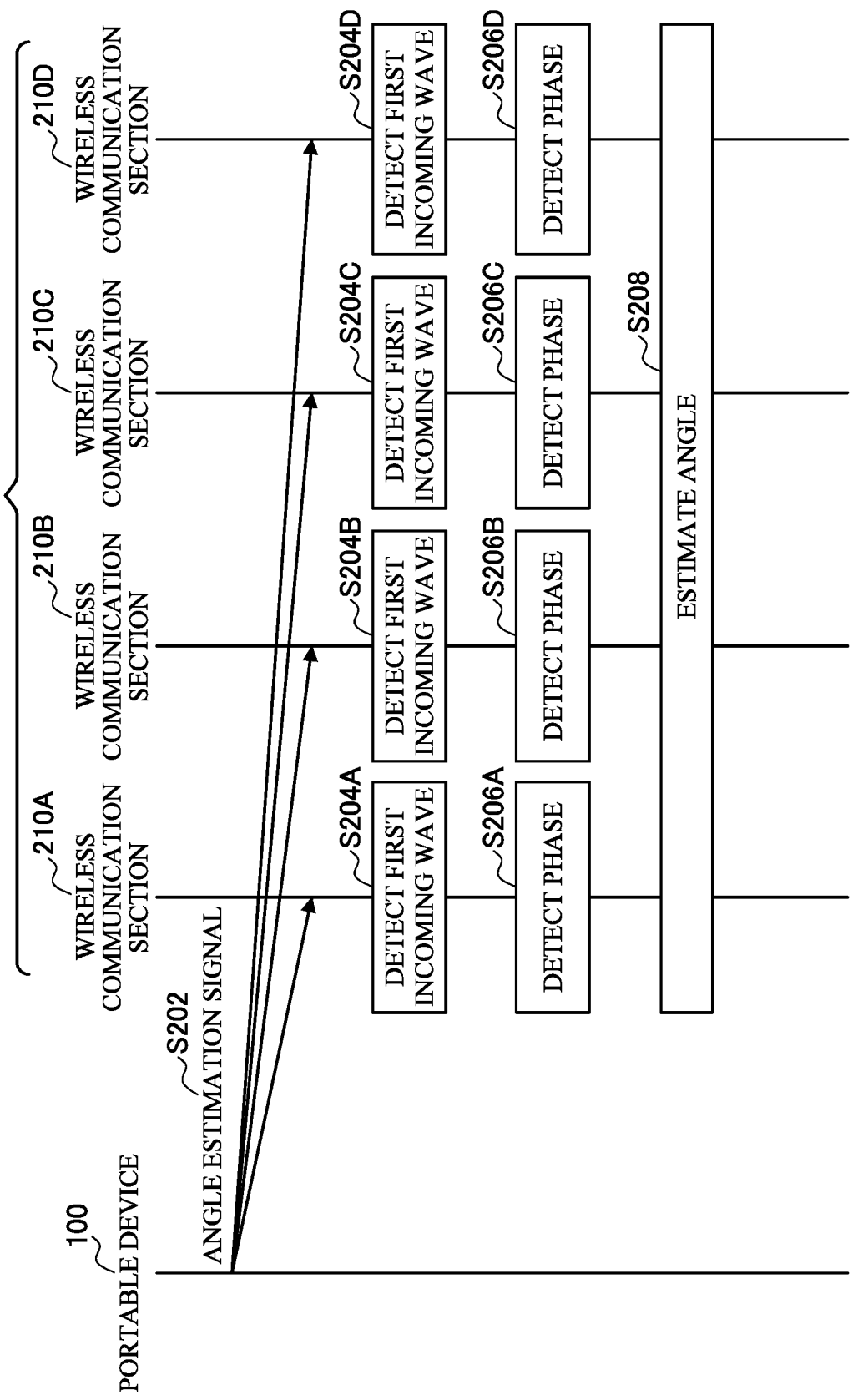
FIG. 8 is a sequence diagram illustrating an example of a flow of an angle estimation process executed in the system according to the embodiment.

FIG. 8 is a sequence diagram illustrating the example of the flow of the angle estimation process executed in the system 1 according to the present embodiment. The portable device 100 and the communication unit 200 are involved in this sequence.

As illustrated in FIG. 8, the portable device 100 first transmits the angle estimation signal (Step S202). Next, when the wireless communication sections 210A to 210D receive respective angle estimation signals, the control section 230 calculates CIRs of the respective angle estimation signals received by the wireless communication sections 210A to 210D. Next, the control section 230 detects first incoming waves of the respective angle estimation signals on the basis of the calculated CIRs with regard to the wireless communication sections 210A to 210D (Step S204A to Step S204D). Next, the control section 230 detects respective phases of the detected first incoming waves with regard to the wireless communication sections 210A to 210D (Step S206A to Step S206D). Next, the control section 230 estimates the angles α and β on the basis of the respective phases of the detected first incoming waves with regard to the wireless communication sections 210A to 210D (Step S208).

Next, details of a process in Step S208 will be described. $P_A$ represents the phase of the first incoming wave detected with regard to the wireless communication section 210A. $P_B$ represents the phase of the first incoming wave detected with regard to the wireless communication section 210B. $P_C$ represents the phase of the first incoming wave detected with regard to the wireless communication section 210C. $P_D$ represents the phase of the first incoming wave detected with regard to the wireless communication section 210D. The wireless communication sections 210A and 210C are a pair of two wireless communication sections 210 disposed in the X axis direction. The wireless communication sections 210B and 210D are a pair of two wireless communication sections 210 disposed in the X axis direction. Each pair forms an antenna array in the X axis direction. The antenna array is a combination of a plurality of antennas. On the other hand, the wireless communication sections 210A and 210B are a pair of two wireless communication sections 210 disposed in the Y axis direction. The wireless communication sections 210C and 210D are a pair of two wireless communication sections 210 disposed in the Y axis direction. Each pair forms an antenna array in the Y axis direction. In this case, antenna array phase differences $Pd_{AC}$ and $Pd_{BD}$ in the X axis direction and antenna array phase differences $Pd_{BA}$ and $Pd_{DC}$ in the Y axis direction are expressed in respective equations listed below. The antenna array phase difference is a difference between phases of the first incoming waves with regard to two antennas 211 (that is, wireless communication sections 210) included in the antenna array.

$$Pd_{AC}=(P_A-P_C)$$

$$Pd_{BD}=(P_B-P_D)$$

$$Pd_{DC}=(P_D-P_C)$$

$$Pd_{BA}=(P_B-P_A) \qquad (2)$$

The angles α and β are calculated by using the following equation. Here, λ represents wavelength of a carrier wave of the angle estimation signal, and d represents a distance between the antennas 211.

$$\alpha \text{ or } \beta = \arccos(\lambda \cdot Pd/(2 \cdot \pi \cdot d)) \qquad (3)$$

Therefore, respective equations listed below represent angles calculated on the basis of the respective antenna array phase differences.

$$\alpha_{AC}=\arccos(\lambda \cdot Pd_{AC}/(2 \cdot \pi \cdot d))$$

$$\alpha_{BD}=\arccos(\lambda \cdot Pd_{BD}/(2 \cdot \pi \cdot d))$$

$$\beta_{DC}=\arccos(\lambda \cdot Pd_{DC}/(2 \cdot \pi \cdot d))$$

$$\beta_{BA}=\arccos(\lambda \cdot Pd_{BA}/(2 \cdot \pi \cdot d)) \qquad (4)$$

The control section 230 calculates the angles α and β on the basis of the calculated angles $\alpha_{AC}$, $\alpha_{BD}$, $\beta_{DC}$, and $\beta_{BA}$. For example, as expressed in the following equations, the control section 230 calculates the angles α and β by averaging the angles calculated with regard to the two respective arrays in the X axis direction and the Y axis direction.

$$\alpha=(\alpha_{AC}+\alpha_{BD})/2$$

$$\beta=(\beta_{DC}+\beta_{BA})/2 \qquad (5)$$

—Cause of Reduction in Accuracy of Estimation

As described above, the angles α and β are calculated on the basis of the phases of the first incoming waves. As described above, the signal detected as the first incoming wave is not necessarily the direct wave.

In other words, sometimes the delayed wave or the combined wave may be detected as the first incoming wave. Typically, phases of the delayed wave and the combined wave are different from the phase of the direct wave. This difference deteriorates accuracy of angle estimation.

—Supplement

Note that, the angle estimation signal may be transmitted/received during the angle estimation process, or at any other timings. For example, the angle estimation signal may be transmitted/received during the ranging process. Specifically, the third ranging signal illustrated in FIG. 7 may be the same as the angle estimation signal illustrated in FIG. 8. In this case, it is possible for the communication unit 200 to calculate the distance R, the angle α, and the angle β by receiving a single wireless signal that serves as both the angle estimation signal and the third ranging signal.

In the above description, the receiver estimates the angle α by averaging the angles $\alpha_{AC}$ and $\alpha_{BD}$ that are estimated on the basis of the difference between phases of the two antenna arrays in the X direction. The receiver may adopt any one of the angles $\alpha_{AC}$ and $\alpha_{BD}$ as the angle α, or may estimate the angle α by averaging the angles estimated on the basis of differences between phases of three or more antenna arrays in the X axis direction. In other words, the receiver may estimate the angle α on the basis of a difference in phases of at least one antenna array in the X axis direction. In a similar way, the receiver may estimate the angle β on the basis of a difference in phases of at least one antenna array in the Y axis direction.

(3) Coordinate Estimation

The control section 230 performs a coordinate estimation process. The coordinate estimation process is a process of estimating three-dimensional coordinates (x, y, z) of the portable device 100 illustrated in FIG. 4. As the coordinate estimation process, a first calculation method and a second calculation method listed below may be adopted.

—First Calculation Method

The first calculation method is a method of calculating the coordinates x, y, and z on the basis of results of the ranging process and the angle estimation process. In this case, the control section 230 first calculates the coordinates x and y by using equations listed below.

$$x = R \cdot \cos \alpha$$

$$y = R \cdot \cos \beta \qquad (6)$$

Here, the distance R, the coordinate x, the coordinate y, and the coordinate z have a relation represented by an equation listed below.

$$R = \sqrt{x^2 + y^2 + z^2} \qquad (7)$$

The control section 230 calculates the coordinate z by using the above-described relation and an equation listed below.

$$z = \sqrt{R^2 - R^2 \cdot \cos^2 \alpha - R \cdot \cos^2 \beta} \qquad (8)$$

—Second Calculation Method

The second calculation method is a method of calculating the coordinates x, y, and z while omitting estimation of the angles α and β. First, the above-listed equations (4), (5), (6), and (7) establish a relation represented by equations listed below.

$$x/R = \cos \alpha \qquad (9)$$

$$y/R = \cos \beta \qquad (10)$$

$$x^2 + y^2 + z^2 = R^2 \qquad (11)$$

$$d \cdot \cos \alpha = \lambda \cdot (Pd_{AC}/2 + Pd_{BD}/2)/(2 \cdot \pi) \qquad (12)$$

$$d \cdot \cos \beta = \lambda \cdot (Pd_{DC}/2 + Pd_{BA}/2)/(2 \cdot \pi) \qquad (13)$$

The equation (12) is rearranged for cos α, and cos α is substituted into the equation (9). This makes it possible to obtain the coordinate x by using an equation listed below.

$$x = R \cdot \lambda \cdot (Pd_{AC}/2 + Pd_{BD}/2)/(2 \cdot \pi \cdot d) \qquad (14)$$

The equation (13) is rearranged for cos β, and cos β is substituted into the equation (10). This makes it possible to obtain the coordinate y by using an equation listed below.

$$y = R \cdot \lambda \cdot (Pd_{DC}/2 + Pd_{BA}/2)/(2 \cdot \pi \cdot d) \qquad (15)$$

Next, the equation (14) and the equation (15) are substituted into the equation (11), and the equation (11) is rearranged. This makes it possible to obtain the coordinate z by using an equation listed below.

$$z = \sqrt{R^2 - x^2 - y^2} \qquad (16)$$

The process of estimating the coordinates of the portable device 100 in the local coordinate system has been described above. It is possible to estimate coordinates of the portable device 100 in the global coordinate system by combining the coordinates of the portable device 100 in the local coordinate system and coordinates of the origin in the local coordinate system relative to the global coordinate system.

—Cause of Reduction in Accuracy of Estimation

As described above, the coordinates are calculated on the basis of the propagation delay time and phases. In addition, they are estimated on the basis of the first incoming waves. Therefore, accuracy of estimating the coordinates may deteriorate in a way similar to the ranging process and the angle estimation process.

(4) Estimation of Existence Region

The positional parameters may include a region including the portable device 100 among a plurality of predefined regions. For example, in the case where the region is defined by a distance from the communication unit 200, the control section 230 estimates the region including the portable device 100 on the basis of the distance R estimated through the ranging process. For another example, in the case where the region is defined by an angle with respect to the communication unit 200, the control section 230 estimates the region including the portable device 100 on the basis of the angles α and β estimated through the angle estimation process. For another example, in the case where the region is defined by the three-dimensional coordinates, the control section 230 estimates the region including the portable device 100 on the basis of the coordinates (x, y, z) estimated through the coordinate estimation process.

Alternatively, in a process specific to the vehicle 202, the control section 230 may estimate the region including the portable device 100 among the plurality of regions including the vehicle interior and the vehicle exterior of the vehicle 202. This makes it possible to provide courteous service such as providing different serves in the case where the user is in the vehicle interior and in the case where the user is in the vehicle exterior. In addition, the control section 230 may estimate the region including the portable device 100 among nearby regions and faraway regions. The nearby regions are regions within a predetermined distance from the vehicle 202, and the faraway region are the predetermined distance or more away from the vehicle 202.

(5) Use Pf Result of Estimating Positional Parameter

For example, a result of estimating the positional parameter may be used for authentication of the portable device 100. For example, the control section 230 determines that the authentication is successful and unlock a door in the case where the portable device 100 is in an area close to the communication unit 200 on a driver seat side.

3. Technical Problem

Detection of the direct waves as the first incoming waves is not always successful with regard to all the wireless communication sections 210. The accuracy of estimating the angle deteriorates in the case where detection of the direct waves as the first incoming waves ends in failure with regard to at least any of the plurality of wireless communication sections 210. In addition, the accuracy of estimating the angle deteriorates in the case where the master fails to detect the direct wave as the first incoming wave. As described above, the accuracy of estimating the positional parameter deteriorate in the case where the detection of the direct waves as the first incoming waves ends in failure.

Therefore, according to the present embodiment, there is provided the mechanism of improving accuracy of estimating a positional parameter by performing control in such a manner that the direct wave is easily detected as the first incoming wave.

4. Technical Features (1) Specific Element Detection Process

The communication unit 200 according to the present embodiment performs position estimation communication. The position estimation communication is communication performed to estimate the positional parameter. Specifically, the position estimation communication includes transmission/reception of the ranging signal and the angle estimation signal between the portable device 100 and the communication unit 200.

Through the position estimation communication, the portable device 100 transmits a transmission signal (example of first signal) including one or more preamble symbols. Each of the plurality of wireless communication sections 210 receives a reception signal (example of second signal) corresponding to the transmission signal. The transmission signal may be the ranging signal or the angle estimation signal. For example, the transmission signal may be the third ranging signal illustrated in FIG. 7 and the signal also serves as the angle estimation signal.

Next, the control section 230 correlates the transmission signal and the respective reception signals received by the plurality of wireless communication sections at the designated interval. This allows the control section 230 to acquire CIRs (integrated CIRs) as respective correlation computation results of the plurality of wireless communication sections 210.

The control section 230 detects one or more elements as a specific element, among a plurality of elements included in the CIR, in accordance with a predetermined detection standard with regard to the respective CIRs of the plurality of wireless communication sections 210, as a specific element detection process. Specifically, in the specific element detection process, the control section 230 detects one or more element whose amplitude component included in the CIR value exceeds a first threshold, as the specific element. The amplitude component included in the CIR value may be amplitude itself or electric power obtained by squaring the amplitude.

The wireless communication sections 210 receive a plurality of pulses that are transmitted as the transmission signals from the portable device 100 through a plurality of paths, as the reception signal. In addition, the specific element corresponds to a pulse detected at earliest time among the plurality of pulses coming through a plurality of paths. In addition, the specific element is an element corresponding to the first incoming wave. In other words, the detection of the specific element is synonymous with the above-described detection of the first incoming wave. In addition, the detection of the direct wave as the first incoming wave is synonymous with detection of the specific element corresponding to the direct wave.

Time corresponding to delay time of the specific element serves as reception time of the first incoming wave and is used for ranging. In addition, the phase of the specific element serves as the phase of the first incoming wave and is used for angle estimation. In other words, the control section 230 detects the respective specific elements to be used for the positional parameter estimation with regard to the plurality of wireless communication sections 210.

For example, it is assumed that, in the specific element detection process, the control section 230 detects an element whose amplitude component included in the CIR value exceeds the first threshold for the first time. In this case, the specific elements are detected one by one with regard to the respective CIRs obtained with regard to the plurality of wireless communication sections 210. The first threshold is the above-described first path threshold. In other words, the specific element is an element whose CIR value exceeds the first path threshold for the first time, among the plurality of elements of the CIR. This makes it possible to reduce computational load for detecting the specific element in comparison with the case of detecting the plurality of specific elements from a single CIR.

Note that, detection of the specific element may be considered as detection of pulse reception time. Accordingly, the detection of the specific element may be considered as detection of a phase obtained at the pulse reception time.

(2) Specific Element Change Process

The control section 230 controls a specific element change process. The specific element change process is a process of changing a specific element of at least any of the plurality of wireless communication sections 210 into another element.

The control section 230 treats a wireless communication section 210 having earliest time corresponding to the specific element as a first wireless communication section 210 among the plurality of wireless communication sections 210. In addition, the control section 230 treats the other wireless communication sections 210 as second wireless communication sections among the plurality of wireless communication sections. In other words, the control section 230 treats wireless communication sections 210 other than the first wireless communication section 210 as the second wireless communication section 210 among the plurality of wireless communication sections 210. Next, the control section 230 controls the specific element change process that is a process of changing the specific elements of the second wireless communication sections 210 on the basis of the time corresponding to the specific element of the first wireless communication section 210. Details thereof will be described with reference to FIG. 9.

FIG. 9 is graphs illustrating examples of CIRs with regard to the plurality of wireless communication sections 210. A CIR 20A illustrated in FIG. 9 is a graph illustrating an example of a CIR with regard to the wireless communication section 210A. A CIR 20B illustrated in FIG. 9 is a graph illustrating an example of a CIR with regard to the wireless communication section 210B. Each graph includes a horizontal axis representing delay time. It is assumed that a time axis of the CIR 20A is synchronous with a time axis of the CIR 20B. The graph includes a vertical axis representing absolute values of CIR values (such as amplitude or electric power).

The CIR 20A includes a set 21A of elements corresponding to the direct wave, and a set 22A of elements corresponding to the delayed wave. In a similar way, the CIR 20B includes a set 21B of elements corresponding to the direct wave, and a set 22B of elements corresponding to the delayed wave. A first path threshold $TH_{FP}$, a specific element $SP_{FP-A}$, and delay time $T_{FP-A}$ of the specific element $SP_{FP-A}$ are illustrated on the CIR 20A. In a similar way, the first path threshold $TH_{FP}$, a specific element $SP_{FP-B}$, and delay time $T_{FP-B}$ of the specific element $SP_{FP-B}$ are illustrated on the CIR 20B.

As illustrated in FIG. 9, the delay time $T_{FP-A}$ of the specific element $SP_{FP-A}$ appears in the set 21A corresponding to the direct wave with regard to the wireless communication section 210A. For example, the delay time $T_{FP-A}$ is 30 ns. On the other hand, the delay time $T_{FP-B}$ of the specific element $SP_{FP-B}$ appears not in the set 21B corresponding to the direct wave, but in the set 22B corresponding to the delayed wave with regard to the wireless communication section 210B. For example, the delay time $T_{FP-B}$ is 33 ns. In other words, it can be said that early delay time of the specific element indicates a high possibility of successfully detecting a specific element corresponding to the direct wave. On the other word, it can be said that late delay time of the specific element indicates a high possibility of unsuccessfully detecting a specific element corresponding to the direct wave because the element corresponding to the direct wave has a low CIR value. In addition, it can be said that, when there is a difference in delay time of the specific element between the plurality of wireless communication sections 210, the plurality of wireless communication sections 210 include both the wireless communication section 210 that has successfully detected the specific element corresponding to the direct wave and the wireless communication section 210 that has unsuccessfully detected the specific element corresponding to the direct wave.

For example, it is assumed that CIRs of the wireless communication section 210C and the wireless communication section 210D are similar to the CIR 20B illustrated in FIG. 9. Therefore, delay times of the specific elements of the wireless communication section 210C and the wireless communication section 210D are similar to the delay time $T_{FP-B}$. In this case, the control section 230 treats the wireless communication section 210A as the first wireless communication section 210. On the other hand, the control section 230 treats the wireless communication section 210B to the wireless communication section 210D as the second wireless communication sections 210. Next, the control section 230 controls the specific element change process with regard to the wireless communication section 210B to the wireless communication section 210D on the basis of time corresponding to the specific element of the wireless communication section 210A (in other words, the delay time $T_{FP-A}$).

Such a configuration makes it possible to change a specific element that is unlikely to correspond to the direct wave, into another element. It is possible to improve the accuracy of estimating an angle in the case where it is possible to successfully change a specific element of at least any of the plurality of wireless communication sections 210, into an element that is likely to correspond to the direct wave. In addition, it is also possible to improve accuracy of ranging in the case where a specific element of the master is successfully changed into the element that is likely to correspond to the direct wave.

In the specific element change process, the control section 230 changes the specific elements of the second wireless communication sections 210 in the case where a difference between time corresponding to the specific element of the first wireless communication section 210 and time corresponding to the specific element of the second wireless communication section 210 exceeds a second threshold. In the example illustrated in FIG. 9, the control section 230 changes the specific element $SP_{FP-B}$ of the wireless communication section 210B in the case where a difference between the delay time $T_{FP-A}$ and the delay time $T_{FP-B}$ exceeds the second threshold. More specifically, the control section 230 changes the specific element $SP_{FP-B}$ of the wireless communication section 210B from an element belonging to the set 22B corresponding to the delayed wave into an element belonging to the set 21B corresponding to the direct wave. This makes it possible to improve accuracy of estimating a positional parameter. Note that, the second threshold is different from at least the first threshold.

Here, the specific element is an element that exceeds the first path threshold for the first time. Therefore, every specific element appears in a first half of a set of elements corresponding to the first incoming wave of the CIR. The first half means a portion from a rise to a peak of the CIR value. For example, as illustrated in FIG. 9, the specific element $S_{FP-A}$ appears in a first half of the set 21A. In addition, as illustrated in FIG. 9, the specific element $S_{FP-B}$ appears in a first half of the set 22B. On the other hand, respective positions of sets of elements corresponding to direct waves are expected to be the same or substantially the same in time direction with regard to the plurality of wireless communication sections 210. For example, as illustrated in FIG. 9, the set 21A of the elements corresponding to the direct wave of the CIR 20A and the set 21B of the elements corresponding to the direct wave of the CIR 20B are disposed at similar positions in the time direction. As described above, it can be said that, in the case where the specific element corresponding to the direct wave is successfully detected with regard to each of the plurality of wireless communication sections 210, a maximum difference in time corresponding to a specific element between the wireless communication sections 210 is a half of the width of the set of the elements corresponding to the direct wave in the time direction.

Therefore, the second threshold is preferably set to any value that is half or less of ideal width of the first incoming wave of the CIR. The ideal width of the first incoming wave of the CIR is ideal width in the time direction of a set of elements corresponding to respective transmission signals (that is, direct waves) coming through shortest paths (that is, first paths) from the portable device 100 to the plurality of wireless communication sections 210 with regard to the Ms. The ideal width of the first incoming wave of the CIR can be calculated through theoretical calculation using waveform of the transmission signal, a reception signal processing method, and the like. Note that, in a simplified way, it is possible to use width of a pulse included in the transmission signal in the time direction as the ideal width of the first incoming wave of the CIR. By setting the second threshold as described above, it is possible to appropriately determine whether detection of the specific element corresponding to the direct wave is failed or not.

Note that, the change of the specific element may be considered as change of pulse reception time. Accordingly, the change of the specific element may be considered as change of a phase obtained at the pulse reception time.

—First Example of Specific Element Change Process

For example, in the specific element change process, the control section 230 may change a specific element to an element whose CIR value exceeds a third threshold for the first time with regard to CIRs of the second wireless communication sections 210. The third threshold is less than the first threshold. Put more simply, the control section 230 may reduce the first path threshold. The third threshold is the reduced first path threshold. Details thereof will be described with reference to FIG. 10.

FIG. 10 is diagrams for describing a first example of the specific element change process according to the present embodiment. A CIR 20A illustrated in FIG. 10 is a graph illustrating an example of a CIR with regard to the wireless communication section 210A. A CIR 20B illustrated in FIG. 10 is a graph illustrating an example of a CIR with regard to the wireless communication section 210B. The CIR 20A and the CIR 20B illustrated in FIG. 10 are similar to the CIR 20A and the CIR 20B illustrated in FIG. 9. However, as illustrated in FIG. 10, a reduced first path threshold $TH_{FP}'$ and a changed specific element $SP_{FP-B}'$ are illustrated on the CIR 20B.

It is assumed that the CIRs illustrated in FIG. 9 are obtained and a difference between $T_{FP-A}$ and $T_{FP-B}$ exceeds the second threshold. In this case, the control section 230 reduces the first path threshold from $TH_{FP}$ to $TH_{FP}'$ with regard to the wireless communication section 210B as illustrated in FIG. 10. The reduced first path threshold $TH_{FP}'$ is an example of the third threshold. As a result, the control section 230 detects, as the specific element, an element $SP_{FP-B}'$ whose CIR value exceeds the reduced first path threshold $TH_{FP}'$ for the first time. The changed specific element $SP_{FP-B}'$ has delay time $T_{FP-B}'$ of 30 ns.

As illustrated in FIG. 10, the changed specific element $SP_{FP-B}'$ appears in the set 21B corresponding to the direct wave. In other words, the control section 230 has successfully detected the specific elements corresponding to the direct waves not only with regard to the wireless communication section 210A but also with regard to the wireless communication section 210B. The control section 230 can detect the specific elements corresponding to the direct waves with regard to all the wireless communication sections 210, by performing the specific element change process on all the second wireless communication sections 210. This makes it possible to improve accuracy of estimating a positional parameter.

Note that, the control section 230 may repeat the specific element change process until a difference between time corresponding to the specific element of the first wireless communication section 210 and time corresponding to the changed specific element of the second wireless communication section 210 becomes the second threshold or less. Such a configuration allows the control section 230 to change the specific element of the second wireless communication section 210 from an element corresponding to the delayed wave to an element corresponding to the direct wave, more certainly.

When performing the specific element change process again, the control section 230 may also perform the position estimation communication again. In this case, the control section 230 reduces the first path threshold, performs the position estimation communication again, and then detects the specific element from the CIR obtained through the position estimation communication performed again. Alternatively, the control section 230 does not have to perform the position estimation communication when performing the specific element change process again. In this case, the control section 230 reduces the first path threshold, and then redetects the specific element from the CIR obtained through the position estimation communication that has already been performed.

—Second Example of Specific Element Change Process

For example, in the specific element change process, the control section 230 may change the specific element of the second wireless communication section 210 to an element corresponding to time related to the specific element of the first wireless communication section 210, among the plurality of elements included in the CIRs of the second wireless communication sections. Put more simply, the control section 230 redetects the specific element of the second wireless communication section 210 in such a manner that the time corresponding to the specific element of the second wireless communication section 210 matches the time corresponding to the specific element of the first wireless communication section 210. Details thereof will be described with reference to FIG. 11.

Figure 11:
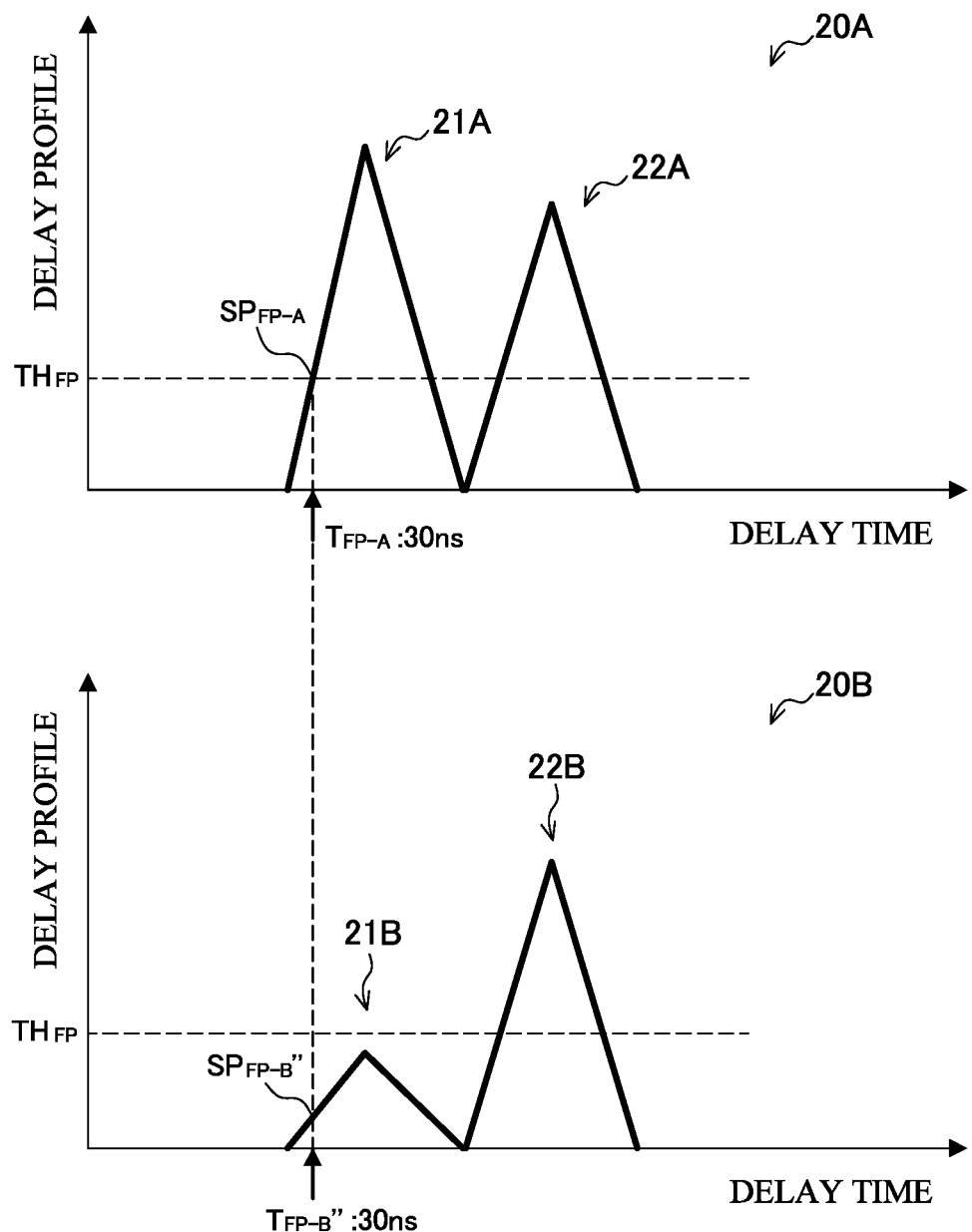
FIG. 11 is diagrams for describing a second example of the specific element change process according to the embodiment.

FIG. 11 is diagrams for describing a second example of the specific element change process according to the present embodiment. A CIR 20A illustrated in FIG. 11 is a graph illustrating an example of a CIR with regard to the wireless communication section 210A. A CIR 20B illustrated in FIG. 11 is a graph illustrating an example of a CIR with regard to the wireless communication section 210B. The CIR 20A and the CIR 20B illustrated in FIG. 11 are similar to the CIR 20A and the CIR 20B illustrated in FIG. 9. However, as illustrated in FIG. 11, a changed specific element $SP_{FP-B}''$ is illustrated on the CIR 20B.

It is assumed that the CIRs illustrated in FIG. 9 are obtained and a difference between $T_{FP-A}$ and $T_{FP-B}$ exceeds the second threshold. In this case, as illustrated in FIG. 11, the control section 230 detects the element $SP_{FP-B}''$ corresponding to $T_{FP-A}$ of the CIR 20B, as the specific element. The changed specific element $SP_{FP-B}''$ naturally has delay time $T_{FP-B}''$ of 30 ns, which is the same as $T_{FP-A}$.

Respective positions of sets of elements corresponding to direct waves are expected to be the same or substantially the same in time direction with regard to the plurality of wireless communication sections 210. For example, as illustrated in FIG. 9, the set 21A of the elements corresponding to the direct wave of the CIR 20A and the set 21B of the elements corresponding to the direct wave of the CIR 20B are disposed at similar positions in the time direction. Therefore, as illustrated in FIG. 11, the changed specific element $SP_{FP-B}''$ appears in the set 21B corresponding to the direct wave. In other words, the control section 230 successfully detects the specific elements corresponding to the direct waves not only with regard to the wireless communication section 210A but also with regard to the wireless communication section 210B. The control section 230 can detect the specific elements corresponding to the direct waves with regard to all the wireless communication sections 210, by performing the specific element change process on all the second wireless communication sections 210. This makes it possible to improve accuracy of estimating a positional parameter.

(3) Signal Arrival Angle Estimation Process

The control section 230 performs a signal arrival angle estimation process. The signal arrival angle estimation process is a process of estimating a ranging signal arrival angle (hereinafter, also referred to as a signal arrival angle) by using axes extending from reference point, which is set to the plurality of wireless communication sections 210, as reference axes. For example, the control section 230 estimates a signal arrival angle on the basis of the specific element of the first wireless communication section 210 and the changed specific element of the second wireless communication section 210.

For example, the reference point is the origin of the local coordinate system of the communication unit 200. For example, the reference axis is a coordinate axis of the local coordinate system of the communication unit 200. In addition, for example, the signal arrival angles are the angles $\alpha$ and $\beta$ described above about the angle estimation process. In this case, the signal arrival angle estimation process is similar to the process of estimating the angles $\alpha$ and $\beta$ in the above-described angle estimation process. In other words, the signal arrival angle corresponds to an angle of the portable device 100 with respect to the communication unit 200. The angle of the portable device 100 is one of the positional parameters of the portable device 100.

Specifically, in the signal arrival angle estimation process, the control section 230 estimates the signal arrival angle on the basis of a phase component included in the CIR value of the specific element of each of the plurality of wireless communication sections 210. For example, the control section 230 estimates the angle α with respect to the X axis, while using a difference between phase components of specific elements of a pair of the wireless communication sections 210 forming an antenna array in the X axis direction, as the antenna array phase difference in the X axis direction. In addition, the control section 230 estimates the angle β with respect to the Y axis, while using a difference between phase components of specific elements of a pair of the wireless communication sections 210 forming an antenna array in the Y axis direction, as the antenna array phase difference in the Y axis direction.

In the signal arrival angle estimation process, the control section 230 may estimate the signal arrival angle on the basis of a specific element whose amplitude component included in the CIR value exceeds a fourth threshold among specific elements of the plurality of wireless communication sections 210. In other words, the control section 230 does not have to use the specific element whose amplitude component is the fourth threshold or less, for the signal arrival angle estimation process. Note that, the fourth threshold is any value that is less than the first path threshold. The specific element having an extremely low amplitude component is considered to include many effects from noise. In this respect, it is possible to suppress the effects from noise by estimating the signal arrival angle on the basis of the specific element whose amplitude component included in the CIR value exceeds the fourth threshold. This makes it possible to suppress reduction in accuracy of estimating the signal arrival angle. In other words, it is possible to suppress reduction in the accuracy of estimating an angle.

(4) Flow of Process

Figure 12:
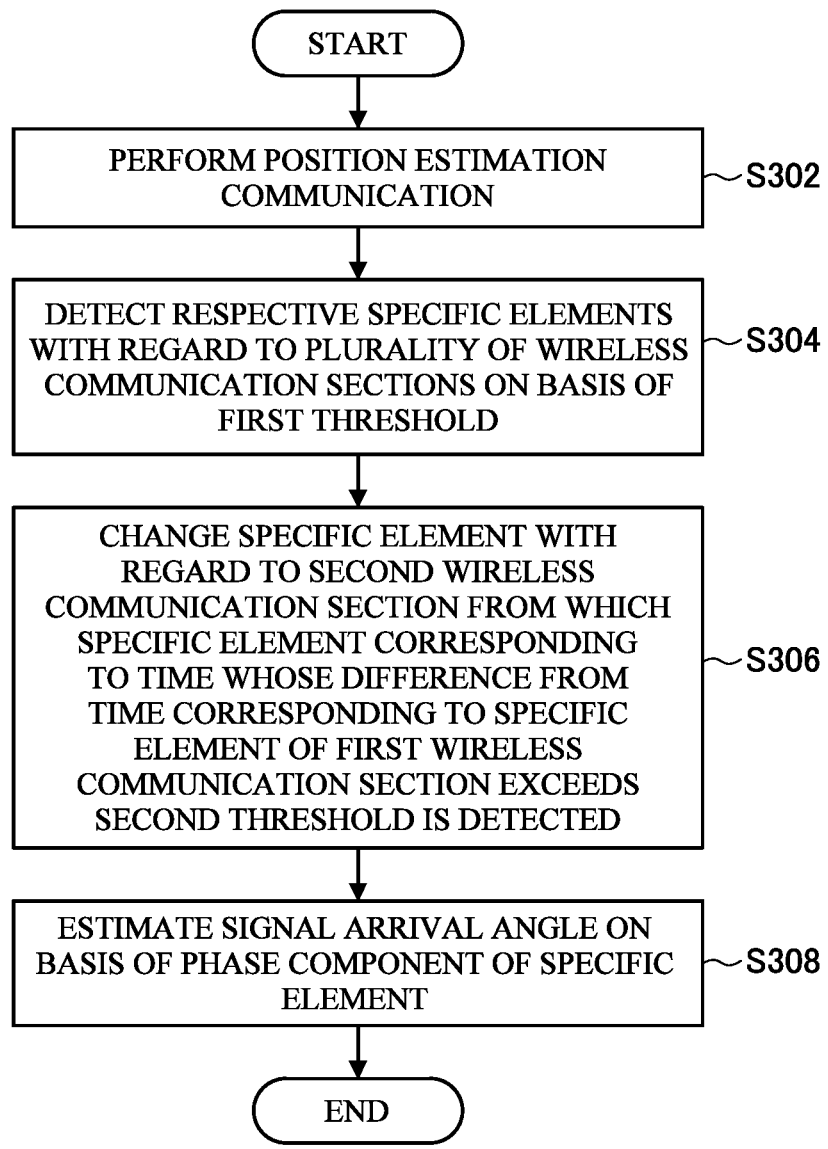
FIG. 12 is a flowchart illustrating an example of a flow of a process executed by the communication unit according to the embodiment.

FIG. 12 is a flowchart illustrating an example of a flow of a process executed by the communication unit 200 according to the present embodiment.

As illustrated in FIG. 12, the communication unit 200 first performs the position estimation communication with the portable device 100 (Step S302). For example, each of the plurality of wireless communication sections 210 receives a ranging signal transmitted from the portable device 100. The ranging signal also serves as the angle estimation signal.

Next, the control section 230 detects respective specific elements with regard to the plurality of wireless communication sections 210 on the basis of the first threshold (Step S304). Specifically, the control section 230 detects an element whose CIR value exceeds the first threshold for the first time as the specific element, among the respective CIRs obtained when the plurality of wireless communication sections 210 receive the respective ranging signals through the position estimation communication.

Next, the control section 230 changes a specific element with regard to the second wireless communication section 210 from which the specific element is detected, the specific element corresponding to time whose difference from time corresponding to the specific element of the first wireless communication section 210 exceeds the second threshold (Step S306). In the first example of the change process, the control section 230 detects an element whose CIR value exceeds the third threshold for the first time as the specific element, among the corresponding second wireless communication sections 210. In the second example of the change process, the control section 230 detects an element corresponding to time corresponding to the specific element of the first wireless communication section 210, as the specific element among the plurality of elements included in the CIR of the corresponding second wireless communication section 210.

Next, the control section 230 estimates the signal arrival angle on the basis of a phase component included in the CIR value of the specific element of each of the plurality of wireless communication sections 210 (Step S308). For example, the control section 230 estimates a signal arrival angle of a ranging signal on the basis of a phase component included in each CIR value of the specific element of the first wireless communication section 210 and the changed specific element of the second wireless communication section 210.

5. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, in the above-described embodiment, improvement in accuracy of estimating an angle has been mainly described as an effect of the present invention. However, effects of the present invention is not limited thereto. It is possible to improve accuracy of ranging in the case where the specific element of the master is changed from the element corresponding to the delayed wave to the element corresponding to the direct wave through the specific element change process. This is because it is possible to improve accuracy of time $T_4$ illustrated in FIG. 7 in the case where the specific element change process is performed on the third ranging signal. In addition, the specific element change process may also be performed not only on the third ranging signal but also on the first ranging signal. In this case, it is possible to also improve accuracy of time $T_3$ in addition to the time $T_4$. This makes it possible to further improve the accuracy of ranging.

For example, the above embodiment has been described on the assumption that the communication unit 200 includes the four wireless communication sections 210. However, present invention is not limited thereto. It is sufficient for the communication unit 200 to include at least three wireless communication sections 210. Alternatively, the communication unit 200 may include the five or more wireless communication sections 210.

For example, in the above-described embodiment, the specific element is an element whose CIR value exceeds the first path threshold for the first time. However, the present invention is not limited thereto. For example, the specific element may be an element whose CIR value exceeds the first path threshold for the second or subsequent time.

For example, the above embodiment has been described on the assumption that the CIR is the correlation computation result. However, present invention is not limited thereto. For example, the CIR may be a reception signal itself. In this case, the CIR includes a result obtained by sampling the pulse received by the wireless communication section 210 at designated intervals, as the element obtained at each timing between the designated intervals. The CIR value is the reception signal received at each delay time. Here, it is sufficient for the CIR value to include at least any of the amplitude component and the phase component of the reception signal. The amplitude component of the reception signal is amplitude or electric power obtained by squaring the amplitude. The phase component of the reception signal is an angle between IQ components of the reception signal and an I axis on an IQ plane. The phase component may be simply referred to as a phase. The reception signal may be a complex number including the IQ components. In the case where the CIR is the reception signal itself, the receiver may use a condition that the amplitude of the received wireless signal exceeds the first path threshold for the first time, as the predetermined detection standard for detecting the first incoming wave. In this case, the receiver may detect an element whose amplitude component of the received wireless signal exceeds the first path threshold for the first time, as the specific element. In other words, the receiver may detect a portion obtained when the amplitude component of the reception signal exceeds the first path threshold for the first time, as the first incoming wave.

For example, in the above-described embodiment, the control section 230 calculates the CIR, detects the first incoming wave (that is, specific element), and estimates the positional parameter. However, the present invention is not limited thereto. Any of the above-described processes may be performed by the wireless communication section 210. For example, each of the plurality of wireless communication sections 210 may calculate the CIR and detect the first incoming wave on the basis of the reception signal received by each of the plurality of wireless communication sections 210. In addition, the positional parameter may be estimated by the wireless communication section 210 that functions as the master.

For example, according to the above-described embodiment, the description has been given with reference to the example in which the angles α and β are calculated on the basis of antenna array phase differences between antennas in a pair. However, the present invention is not limited thereto. For example, the communication unit 200 may calculate the angles α and β through beamforming using the plurality of antennas 211. In this case, the communication unit 200 scans main lobes of the plurality of antennas 211 in all the directions, determines that the portable device 100 exists in a direction with largest reception electric power, and calculates the angles α and β on the basis of this direction.

For example, according to the above-described embodiment, as described with reference to FIG. 3, the local coordinate system has been treated as a coordinate system including coordinate axes parallel to axes connecting the antennas in the pairs. However, the present invention is not limited thereto. For example, the local coordinate system may be a coordinate system including coordinate axes that are not parallel to the axes connecting the antennas in the pairs. In addition, the origin is not limited to the center of the plurality antennas 211. The local coordinate system according to the present embodiment may be arbitrarily set on the basis of arrangement of the plurality of antennas 211 of the communication unit 200.

For example, although the example in which the portable device 100 serves as the authenticatee and the communication unit 200 serves as the authenticator has been described in the above embodiment, the present invention is not limited thereto. The roles of the portable device 100 and the communication unit 200 may be reversed. For example, the positional parameter may be estimated by the portable device 100. In addition, the roles of the portable device 100 and the communication unit 200 may be switched dynamically. In addition, a plurality of the communication units 200 may determine the positional parameters, and perform authentication.

For example, although the example in which the present invention is applied to the smart entry system has been described in the above embodiment, the present invention is not limited thereto. The present invention is applicable to any system that estimates the positional parameter and performs the authentication by transmitting/receiving signals. For example, the present invention is applicable to a pair of any two devices selected from a group including portable devices, vehicles, smartphones, drones, houses, home appliances, and the like. In this case, one in the pair operates as the authenticator, and the other in the pair operates as the authenticatee. Note that, the pair may include two device of a same type, or may include two different types of devices. In addition, the present invention is applicable to a case where a wireless local area network (LAN) router estimates a position of a smartphone.

For example, in the above embodiment, the standard using UWB has been exemplified as the wireless communication standard. However, the present invention is not limited thereto. For example, it is also possible to use a standard using infrared as the wireless communication standard.

Note that, a series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes the programs, the programs are read into random access memory (RAM), and executed by a processor such as a CPU. The recording medium may be a magnetic disk, an optical disc, a magneto-optical disc, flash memory, or the like. Alternatively, the above-described computer program may be distributed via a network without using the recording medium, for example.

Further, in the present specification, the processes described using flowcharts are not necessarily executed in the order illustrated in the drawings. Some processing steps may be executed in parallel. In addition, additional processing steps may be employed and some processing steps may be omitted.

REFERENCE SIGNS LIST 1 system
100 portable device
110 wireless communication section
111 antenna
120 storage section
130 control section
200 communication unit
202 vehicle
210 wireless communication section
211 antenna
220 storage section
230 control section

What is claimed is:
1. A communication device, comprising:
a plurality of wireless communicators, each of which is configured to wirelessly receive a signal from another communication device; and
a controller configured to
correlate a first signal that is transmitted from the another communication device and that includes change in amplitude with respective second signals obtained when the plurality of wireless communicators receive the first signal, at a designated interval, perform a detection process of detecting one or more elements whose correlation value indicating magnitude of correlation between the first signal and the second signals exceeds a first threshold as specific elements, with regard to a plurality of correlation computation results, each of which is obtained by correlating the first signal and each of the second signals at the designated interval and includes the correlation value as an element obtained at the designated interval, and control a change process of treating a wireless communicator having earliest time corresponding to the specific element as a first wireless communicator among the plurality of wireless communicators, treating the another wireless communicator as a second wireless communicator among the plurality of wireless communicators, and changing the specific element of the second wireless communicator on a basis of time corresponding to the specific element of the first wireless communicator.

2. The communication device according to claim 1, wherein, in the detection process, the controller detects the element whose correlation value exceeds the first threshold for first time, as the specific element.

3. The communication device according to claim 2, wherein, in the change process, the controller changes the specific element of the second wireless communicator in a case where a difference between time corresponding to the specific element of the first wireless communicator and time corresponding to the specific element of the second wireless communicator exceeds a second threshold, which is different from the first threshold.

4. The communication device according to claim 3, wherein the second threshold is any value that is half or less of ideal width in time direction of a set of the elements corresponding to transmission signals coming through shortest paths from the another communication device to the plurality of wireless communicators with regard to the correlation computation results.

5. The communication device according to claim 2, wherein, in the change process, the controller changes the specific element to the element whose correlation value exceeds a third threshold for first time with regard to the correlation computation result of the second wireless communicator, the third threshold being less than the first threshold.

6. The communication device according to claim 2, wherein, in the change process, the controller changes the specific element of the second wireless communicator to an element corresponding to time related to the specific element of the first wireless communicator, among the plurality of elements included in the correlation computation result of the second wireless communicator.

7. The communication device according to claim 1, wherein the controller performs an estimation process of estimating an angle from which the first signal comes while using axes extending from reference point, which is set to the plurality of wireless communicators, as reference axes, on a basis of the respective specific elements of the plurality of wireless communicators.

8. The communication device according to claim 7, wherein, in the estimation process, the controller estimates the angle from which the first signal comes on a basis of phase components included in the correlation values of the respective specific elements of the plurality of wireless communicators.

9. The communication device according to claim 8, wherein, in the estimation process, the controller estimates the angle from which the first signal comes on a basis of the specific element whose amplitude component included in the correlation value exceeds a fourth threshold among the respective specific elements of the plurality of wireless communicators, the fourth threshold being less than the first threshold.

10. The communication device according to claim 1, wherein the wireless communicator receives, as the second signals, changes in amplitude that is transmitted as the first signal and that comes from the another communication device through a plurality of paths, and the specific element corresponds to a change in the amplitude that has been detected at earliest time among the changes in amplitude coming through the plurality of paths.

11. An information processing method that is performed by a communication device including a plurality of wireless communicators, each of which is configured to wirelessly receive a signal from another communication device, the information processing method comprising:

correlating a first signal that is transmitted from the another communication device and that includes change in amplitude with respective second signals obtained when the plurality of wireless communicators receive the first signal, at a designated interval;

performing a detection process of detecting one or more elements whose correlation value indicating magnitude of correlation between the first signal and the second signals exceeds a first threshold as specific elements, with regard to a plurality of correlation computation results, each of which is obtained by correlating the first signal and each of the second signals at the designated interval and includes the correlation value as an element obtained at the designated interval; and controlling a change process of treating a wireless communicator having earliest time corresponding to the specific element as a first wireless communicator among the plurality of wireless communicators, treating the another wireless communicator as a second wireless communicator among the plurality of wireless communicators, and changing the specific element of the second wireless communicator on a basis of time corresponding to the specific element of the first wireless communicator.

12. A non-transitory storage medium having a program stored therein, the program causing a computer for controlling a communication device including a plurality of wireless communicators, each of which is configured to wirelessly receive a signal from another communication device, to function as a controller configured to correlate a first signal that is transmitted from the another communication device and that includes change in amplitude with respective second signals obtained when the plurality of wireless communicators receive the first signal, at a designated interval;

perform a detection process of detecting one or more elements whose correlation value indicating magnitude of correlation between the first signal and the second signals exceeds a first threshold as specific elements, with regard to a plurality of correlation computation results, each of which is obtained by correlating the first signal and each of the second signals at the designated interval and includes the correlation value as an element obtained at the designated interval; and control a change process of treating a wireless communicator having earliest time corresponding to the specific element as a first wireless communicator among the plurality of wireless communicators, treating the another wireless communicator as a second wireless communicator among the plurality of wireless communicators, and changing the specific element of the second wireless communicator on a basis of time corresponding to the specific element of the first wireless communicator.

* * * * *